United States Patent
Yang et al.

(10) Patent No.: US 9,633,594 B2
(45) Date of Patent: Apr. 25, 2017

(54) DISPLAY DEVICE AND ELECTRONIC APPARATUS

(71) Applicant: Lenovo (Beijing) Co., Ltd., Beijing (CN)

(72) Inventors: Guang Yang, Beijing (CN); Ke Shang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 58 days.

(21) Appl. No.: 14/583,606

(22) Filed: Dec. 27, 2014

(65) Prior Publication Data
US 2016/0071451 A1    Mar. 10, 2016

(30) Foreign Application Priority Data

Sep. 5, 2014   (CN) .......................... 2014 1 0453827

(51) Int. Cl.
*G09G 3/20*     (2006.01)
*G09G 3/00*     (2006.01)
*G02B 27/01*    (2006.01)
*G06F 3/14*     (2006.01)

(52) U.S. Cl.
CPC ......... *G09G 3/2092* (2013.01); *G02B 27/017* (2013.01); *G09G 3/002* (2013.01); *G09G 3/20* (2013.01); *G06F 3/1423* (2013.01); *G09G 2300/023* (2013.01);
(Continued)

(58) Field of Classification Search
CPC .............. G09G 3/2092; G09G 3/2096; G09G 2310/0264; G09G 2300/0421; G09G 2300/0426; G09G 3/002; G09G 3/20; G09G 2310/0278; G09G 2300/023;
(Continued)

(56) References Cited

U.S. PATENT DOCUMENTS 9,274,389 B2* 3/2016 Kang .................... G02F 1/1345
9,299,961 B2* 3/2016 Horiguchi ........... H01L 51/5253
(Continued)

FOREIGN PATENT DOCUMENTS

DE           3817967       12/1988
DE      102012216169        3/2014

OTHER PUBLICATIONS

DE 102014019638.0 First Office Action dated Jul. 15, 2015 (17 pages including English translation).

*Primary Examiner* — Tom Sheng
(74) *Attorney, Agent, or Firm* — Brinks Gilson & Lione; G. Pater Nichols

(57) ABSTRACT

A display device includes an array of display cells having a plurality of display subunits; a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit; a display drive unit, connected with the drive lines, to provide a display drive signal for the plurality of first type of drive lines and the plurality of second type of drive lines; wherein at least one drive line of at least one type of drive lines of the plurality of first type of drive lines and the plurality of second type of drive lines is a curve.

15 Claims, 24 Drawing Sheets

(52) U.S. Cl.
CPC ............... *G09G 2300/0426* (2013.01); *G09G 2310/0264* (2013.01); *G09G 2310/0278* (2013.01)

(58) Field of Classification Search
CPC . G06F 3/1423; H01L 27/326; H01L 27/3276; G02F 1/134309; G02B 27/017
USPC ......................................................... 345/204
See application file for complete search history.

(56) References Cited

U.S. PATENT DOCUMENTS

| | | | | |
|---|---|---|---|---|
| 2003/0086045 | A1* | 5/2003 | Ono | G02F 1/134309 349/141 |
| 2006/0044928 | A1* | 3/2006 | Chui | G02B 26/001 365/232 |
| 2006/0164350 | A1* | 7/2006 | Kim | G09G 3/3614 345/87 |
| 2008/0018557 | A1* | 1/2008 | Maeda | G02F 1/167 345/55 |
| 2008/0036707 | A1* | 2/2008 | Sung | G09G 3/3225 345/76 |
| 2008/0088568 | A1 | 4/2008 | Haga et al. | |
| 2008/0129670 | A1* | 6/2008 | Ma | G02F 1/136213 345/88 |
| 2008/0204613 | A1* | 8/2008 | Kim | G02F 1/133707 349/33 |
| 2009/0122248 | A1* | 5/2009 | Kim | G02F 1/134309 349/139 |
| 2009/0189835 | A1* | 7/2009 | Kim | G09G 3/3677 345/80 |
| 2010/0006838 | A1* | 1/2010 | Yoshida | G09G 3/006 257/48 |
| 2010/0073618 | A1* | 3/2010 | Yoo | G09G 3/3648 349/152 |
| 2010/0182530 | A1* | 7/2010 | Fujikawa | G02F 1/1339 349/58 |
| 2011/0279418 | A1* | 11/2011 | Han | G02F 1/136286 345/204 |
| 2012/0154724 | A1* | 6/2012 | Yang | G02F 1/134309 349/108 |
| 2014/0055702 | A1* | 2/2014 | Park | G02F 1/136286 349/43 |
| 2014/0253419 | A1* | 9/2014 | Tanada | G09G 3/2092 345/55 |
| 2015/0302786 | A1* | 10/2015 | Wang | G09G 3/20 345/55 |
| 2015/0331526 | A1* | 11/2015 | Hashida | G06F 3/044 345/174 |

* cited by examiner

DISPLAY DEVICE AND ELECTRONIC APPARATUS

This application claims priority to Chinese patent application No. 201410453827.8 filed on Sep. 5, 2014 the entire contents of which are incorporated herein by reference.

The present application relates to the field of display technique, and more particularly, to a display device and an electronic apparatus using the display device.

BACKGROUND

As the miniaturized portable electronic apparatus prevails, a display device employed on an electronic apparatus typically needs to adapt to shape of the electronic apparatus, and thus has an unconventional shape different than a rectangular. Furthermore, for the miniaturized portable electronic apparatus, one or more frame regions of the display device thereof needs to be configured as sufficiently narrow, even there is no additional frame other than an effective display area. Wiring of a conventional display device involves usually comprising row and column drive lines that provide a display drive signal to each subunit of an array of display cells arranged in matrix, and a display drive unit that provides a drive signal to each of the row and column drive lines. Wiring of the row and column drive lines and the display drive unit usually are arranged at edge of one side or two sides of the display device, so it is hard to satisfy the configuration requirements of unconventional shape and narrow frame and so on as required by the miniaturized portable electronic apparatus.

It is therefore desirable to provide a display device and an electronic apparatus using the display device, which can configure the drive lines and the display drive unit more flexibly as needed by design, thus meeting configuration requirements of the electronic apparatus having different shapes.

SUMMARY

According to an embodiment of the present application, there is provided a display device, comprising: an array of display cells, comprising a plurality of display subunits; a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit; a display drive unit, connected with the plurality of first type of drive lines and the plurality of second type of drive lines, to provide a display drive signal for the plurality of first type of drive lines and the plurality of second type of drive lines; wherein at least one drive line of at least one type of drive lines of the plurality of first type of drive lines and the plurality of second type of drive lines is a curve.

In addition, in the display device according to an embodiment of the present application, wherein edge of a visible area of the display device is divided into two portions, edge of the visible area corresponding to the plurality of first type of drive lines and the plurality of second type of drive lines connected with the display drive unit is located in a first portion of the two portions.

In addition, in the display device according to an embodiment of the present application, wherein an edge length of the visible area corresponding to the first portion is less than 50% of a total edge length of the visible area.

In addition, in the display device according to an embodiment of the present application, wherein each of the plurality of first type of drive lines is a straight line, and each of the plurality of second type of drive lines is a curve.

In addition, in the display device according to an embodiment of the present application, wherein each of the plurality of first type of drive lines and the plurality of second type of drive lines is a curve.

In addition, in the display device according to an embodiment of the present application, wherein shape of the curve matches with shape of the edge.

In addition, in the display device according to an embodiment of the present application, wherein at least a portion of the edge is a curve, and the edge is at least divided into a first edge portion and a second edge portion, the first edge portion and the second edge portion have different curvatures.

In addition, in the display device according to an embodiment of the present application, wherein the plurality of drive lines are projected as a plurality of curves arranged equidistantly on a plane vertical to a display direction of the array of display cells.

In addition, in the display device according to an embodiment of the present application, wherein the plurality of first type of drive lines and the plurality of second type of drive lines are divided into at least two groups of drive lines, each group of the at least two groups of drive lines is connected to the display drive unit.

According to another embodiment of the present application, there is provided a display device, comprising: an array of display cells, comprising a plurality of display subunits; a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit; a display drive unit, connected with the plurality of first type of drive lines and the plurality of second type of drive lines, to provide a display drive signal for the plurality of first type of drive lines and the plurality of second type of drive lines; wherein edge of a visible area of the display device is divided into two portions, edge of the visible area corresponding to the plurality of first type of drive lines and the plurality of second type of drive lines connected with the display drive unit is located in a first portion of the two portions, an edge length of the visible area corresponding to the first portion is less than 50% of a total edge length of the visible area.

According to another embodiment of the present application, there is provided an electronic apparatus, comprising: a main body that comprises a processing unit configured to execute control processing of the electronic apparatus: a first display device at least partially provided within the main body and configured to execute display of a first image, wherein the first display device comprises:an array of display cells, comprising a plurality of display subunits; a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit; a display drive unit, connected with the plurality of first type of drive lines and the plurality of second type of drive lines, to provide a display drive signal for the plurality of first type of drive lines and the plurality of second type of drive lines;

wherein at least one drive line of at least one type of drive lines of the plurality of first type of drive lines and the plurality of second type of drive lines is a curve.

In addition, the electronic apparatus according to another embodiment of the present application further comprises a fixing body connected with the main body and configured to fix a position relationship relative to a user of the electronic apparatus, wherein the fixing body comprises at least a fixed state in which the fixing body can serve as at least a portion of an annular space or an approximate annular space that meets a first predetermined condition, the annular space or the approximate annular space can surround periphery of a columnar body that meets a second predetermined condition.

In addition, the electronic apparatus according to another embodiment of the present application further comprises a second display device configured to execute display of a second image and provided within the main body and/or the fixing body, wherein the first display device and the second display device are different types of display device.

In addition, in the electronic apparatus according to another embodiment of the present application, wherein the second display device comprises: a display component configured to output initial light corresponding to the second image; and a light path converting component configured to receive the initial light corresponding to the second image from the display component, and perform light path conversion on the initial light corresponding to the second image to thereby form a virtual image corresponding to the second image, wherein the virtual image corresponding to the second image can be perceived by a viewer at a particular position, and a size of the virtual image perceived is greater than a display size of the display component.

In addition, in the electronic apparatus according to another embodiment of the present application, wherein light that forms the second image in the display component is on a first plane, light that forms the virtual image corresponding to the second image and exits from the light path converting component is on a second plane, there is a first angle between the first plane and the second plane, so that a first size of the display component in a direction vertical to the first plane is smaller than a second size of the display component in a direction parallel to the first plane.

In addition, in the electronic apparatus according to another embodiment of the present application, wherein the display component comprises: a light emitting unit configured to emit backlight towards the first direction; and a display unit provided within an irradiation area of the backlight, and configured to generate the initial light corresponding to the second image based on the second image, wherein the light emitting unit comprises a light source subunit and a light guide subunit, the light source subunit is configured to emit light towards a second direction, the light guide subunit is provided within an irradiation area of the light, the light transmits through the light guide subunit to form the backlight; wherein the first direction and the second direction are different, so that a size of the display component in the first direction is smaller than a size of the display component in the first direction in the case that the first direction and the second direction are the same.

In addition, in the electronic apparatus according to another embodiment of the present application, wherein the first display device has a first visible area corresponding to the array of display cells, the second display device has a second visible area, which is at least a portion of a surface that exits light of the wave guide unit, the second visible area corresponds to a portion of the light path converting component from which the light corresponding to the second image in the light path converting component exits, the first visible area and the second visible area have a first state of being provided overlapped on the main body, or the first visible area and the second visible area have a second state of being provided side by side on the main body and the fixing body.

In addition, in the electronic apparatus according to another embodiment of the present application, wherein at least a portion of edge of the first display device, which borders upon the second visible area, is a curve.

The display device according to the embodiments of the present application and the electronic apparatus using the display device can configure the drive lines and the display drive unit more flexibly as needed by design, thus meeting configuration requirements of the electronic apparatus having different shapes.

It is to be understood that both the foregoing general descriptions and the following detailed descriptions are exemplary and intended to provide further explanation of the claimed technique.

DETAILED DESCRIPTION

Hereinafter, the embodiments of the present application will be described in detail with reference to the accompanying drawings.

First, a display device according to an embodiment of the present application will be described with reference to FIGS. 1 to 9B. The display device according to an embodiment of the present application may be a display device such as a liquid crystal display, an LED display, a plasma display or the like to which a drive signal needs to be provided.

Figure 1:
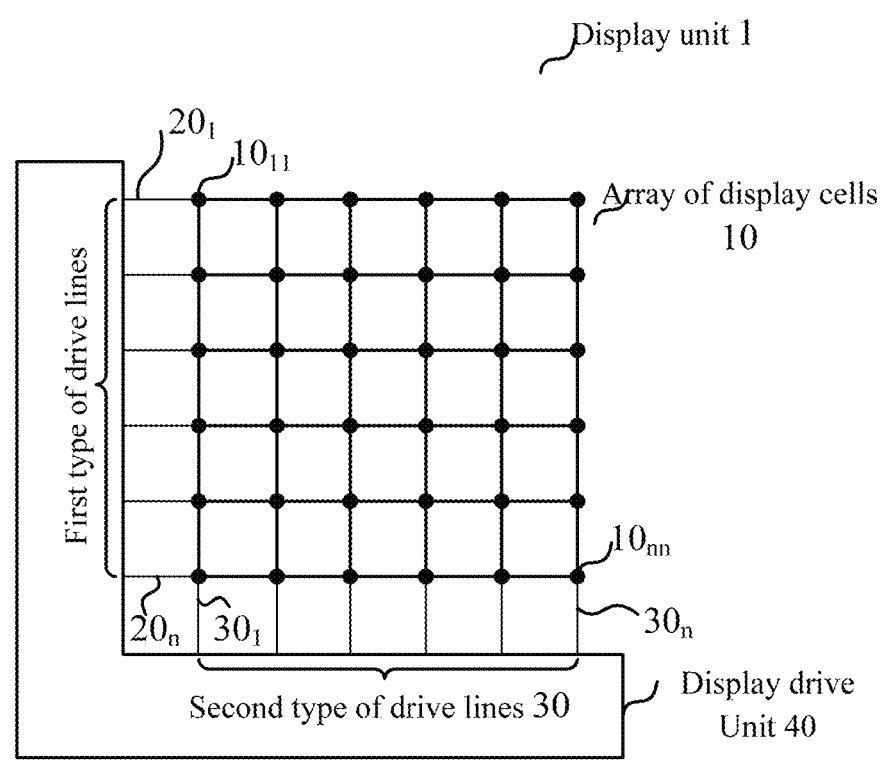
FIG. 1 is a structural block diagram briefly illustrating a display device according to an embodiment of the present application.

FIG. 1 is a structural block diagram briefly illustrating a display device according to an embodiment of present application. As shown in FIG. 1, the display device 1 comprises an array of display cells 10, a plurality of first type of drive lines 20, a plurality of second type of drive lines 30, and a display drive unit 40. Specifically, the array of display cells 10 comprises a plurality of display subunits $10_{11} \ldots 10_{mn}$. As can be readily appreciated, the array of display cells 10 composed by a plurality of display subunits as shown in FIG. 1 is merely illustrative, wherein the number of the plurality of display subunits and their specific layout may vary depending on the design and use requirements. Each $(20_1 \ldots 20_n)$ of the plurality of first type of drive lines 20 intersects with each $(30_1 \ldots 30_n)$ of the plurality of second type of drive lines 30, intersection thereof corresponds to each display subunit of the plurality of display subunits $(10_{11} \ldots 10_{mn})$, to provide a display drive signal for each display subunit. The display drive unit 40 is connected with the plurality of first type of drive lines and the plurality of second type of drive lines, to provide a display drive signal for the plurality of first type of drive lines and the plurality of second type of drive lines.

Different than the configuration manner that a plurality of first type of drive lines and a plurality of second type of drive lines are connected respectively to a horizontal drive unit and a vertical drive unit in the related art, the display device according to an embodiment of the present application may comprise only a single display drive unit 40, thereby wiring space needed for arranging the display drive unit is saved and design complexity is simplified. Specific configurations of the display devices according to the first to fifth embodiments of the present application will be further described below with reference to FIGS. 2 to 6B.

Figure 2:
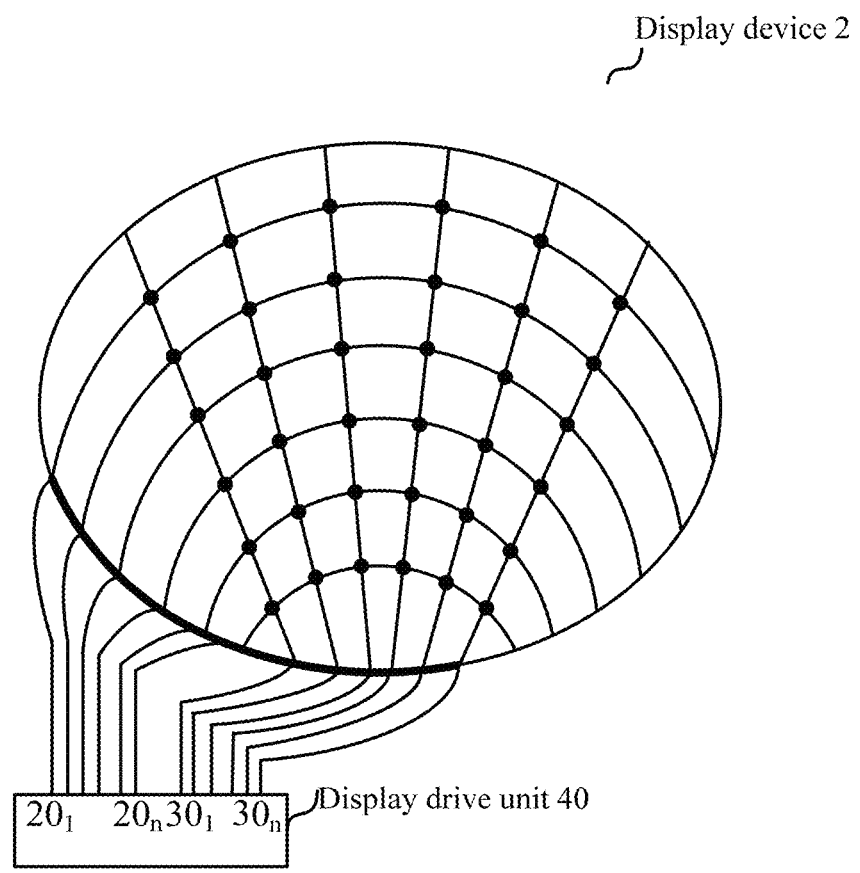
FIG. 2 is a schematic diagram illustrating a display device according to a first embodiment of the present application.

FIG. 2 is a schematic diagram illustrating a display device according to a first embodiment of the present application. In the display device 2 according to the first embodiment of the present application, at least one drive line of at least one type of drive lines of the plurality of first type of drive lines and the plurality of second type of drive lines is a curve. As shown in FIG. 2, each $(20_1 \ldots 20_n)$ of the plurality of first type of drive lines 20 is a curve, and each $(30_1 \ldots 30_n)$ of the plurality of second type of drive lines 30 is a straight line. As can be readily appreciated, the number of the drive lines and the wiring manner as shown in FIG. 2 are merely illustrative, the display device according to an embodiment of the present application is not limited thereto. In another embodiment of the present application, it is allowed that the plurality of second type of drive lines $(30_1 \ldots 30_n)$ are a curve, or alternatively, each or more drive lines among the plurality of first type of drive lines $(20_1 \ldots 20_n)$ and the plurality of second type of drive lines $(30_1 \ldots 30_n)$ are a curve.

As shown in FIG. 2, edge of a visible area of the display device 2 is divided into two portions, edge of the visible area corresponding to the plurality of first type of drive lines and the plurality of second type of drive lines connected with the display drive unit 40 is located in a first portion of the two portions, that is, the edge portion shown with a bolded line in FIG. 2, whereas edge of the visible area where the plurality of first type of drive lines and the plurality of second type of drive lines connected with the display drive unit 40 are not arranged is the second portion. In the embodiment shown in FIG. 2, the first portion and the second portion have two intersection points, that is, the first portion and the second portion are two separate continuous edge areas, respectively, only intersect at their respective endpoints. As can be readily appreciated, coverage of the present application is not limited thereto, the first portion and the second portion may be divided into a plurality of sub-portions, respectively, the plurality of sub-portions of the first portion and the second portion may be alternately distributed as shown below with reference to FIGS. 5A to 7B. Since the plurality of first type of drive lines $(20_1 \ldots 20_n)$ are a curve, so that edge of the first portion may tend to cluster. That is, an edge length of the visible area corresponding to the first portion is less than 50% of a total edge length of the visible area. For example, in the example shown in FIG. 2, an edge length of the visible area corresponding to the first portion where drive lines are provided is ⅓ of a total edge length of the visible area. Thus, the display device 2 can be provided with a larger edge area that needs no drive line wiring, which thereby facilitates further narrowing the frame of the display device 2. That is, in an electronic apparatus where the display device 2 according to an embodiment of the present application is configured, the display device 2 may adapt to the shape of the electronic apparatus as needed. Specifically, by adopting the configuration that at least one drive line of at least one type of drive lines of the plurality of first type of drive lines and the plurality of second type of drive lines is a curve, it is possible to bent the drive lines towards the edge of the display device that adapts to wiring based on the shape of the electronic apparatus, and select not to configure wiring at the edge having no wiring space of the display device based on the shape of the electronic apparatus. Herein, the edge having no wiring space of the display device may be an edge where the edge of the display device substantially overlaps with the outer frame of the electronic apparatus per se. Alternatively, the edge having no wiring space of the display device may be an edge of the electronic apparatus where the outer frame thereof is of an irregular shape and thus is inconvenient for wiring.

In addition, as shown in FIG. 2, curve shape of the drive lines matches with shape of the edge of the display device. In the display device 2 as shown in FIG. 2, shape of the edge of the display device 2 is an ellipse. As can be readily appreciated, depending on application requirements, the shape of the edge of the display device according to an embodiment of the present application is not limited to ellipse, instead it may be a variety of regular shapes like circle or irregular shapes. The shape of the drive lines being a curve can implement better matching with the edge of the display device, which is a variety of regular or irregular shapes.

Specifically, the plurality of first type of drive lines $(20_1 \ldots 20_n)$ which are curves have the same curvature as the corresponding edge of the display device 2. In particular, in the example shown in FIG. 2, the plurality of first type of drive lines $(20_1 \ldots 20_n)$ and part of the edge of the display device 2 form a curve group having the same circle center and radial outward to the outer center layer by layer, wherein part of the edge of the display device 2 is the outermost edge of the concentric nested curve group. Then the plurality of second type of drive lines $(30_1 \ldots 30_n)$ may approximately be a plurality of straight lines radiated radially outward from the circle center. Extension lines of the plurality of second type of drive lines $(30_1 \ldots 30_n)$ will intersect at the circle center. Further, the plurality of second type of drive lines $(30_1 \ldots 30_n)$ may be divided into two groups symmetrical with respect to a center cross-section of the display device 2, for example, drive lines $30_1$, $30_2$, $30_3$, and drive lines $30_{n-2}$, $30_{n-1}$, $30_n$.

In addition, as shown in FIG. 2, the plurality of first type of drive lines $(20_1 \ldots 20_n)$ are projected as a plurality of curves arranged equidistantly on a plane vertical to a display direction of the array of display cells. In an embodiment of the present application, a surface where the array of display cells resides probably has fluctuation according to the shape of the electronic apparatus to which it is applied. For example, when the display device is applied to a dial of a smart watch which is a convex surface, the surface where the array of display cells resides may be a convex surface corresponding to the dial. The direction of the convex outwardly facing the user is the display direction of the array of display cells, the plurality of first type of drive lines $(20_1 \ldots 20_n)$ are projected as a plurality of curves arranged equidistantly on a plane vertical to the display direction.

Figure 3:
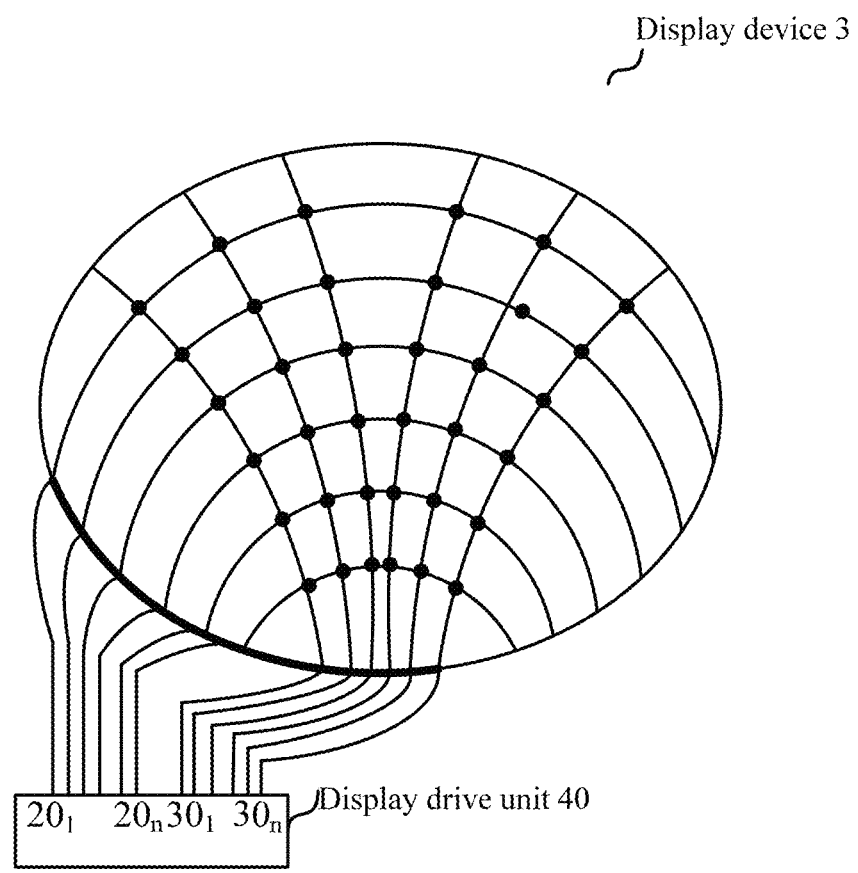
FIG. 3 is a schematic diagram illustrating a display device according to a second embodiment of the present application.

FIG. 3 is a schematic diagram illustrating a display device according to a second embodiment of the present application. In the display device 3 according to a second embodiment of the present application, each $(20_1 \ldots 20_n)$ of the plurality of first type of drive lines 20 and each of $(30_1 \ldots 30_n)$ the plurality of second type of drive lines 30 is a curve. Specifically, similar to what is shown in FIG. 2, the plurality of first type of drive lines $(20_1 \ldots 20_n)$ and part of the edge of the display device 3 form a curve group having the same circle center and radial outward to the outer center layer by layer, wherein part of the edge of the display device 3 is the outermost edge of the concentric nested curve group. The plurality of second type of drive lines $(30_1 \ldots 30_n)$ are approximately divided into two groups symmetrical with respect to a center cross-section of the display device 3, for example, drive lines $30_1$, $30_2$, $30_3$, and drive lines $30_{n-2}$, $30_{n-1}$, $30_n$, wherein each group of drive lines $(30_1, 30_2, 30_3)$ or $(30_{n-2}, 30_{n-1}, 30_n)$ are a portion of a group of inscribed circles that are nested mutually and have a common tangent point.

Accordingly, as compared with the display device 2 according to the first embodiment of the present application as shown in FIG. 2, by configuring all the plurality of first type of drive lines 20 and the plurality of second type of drive lines 30 as curves, it is possible to further reduce an edge length of the visible area corresponding to the first portion where the drive lines are provided. For example, in the example shown in FIG. 3, an edge length of the visible area corresponding to the first portion where the drive lines are provided is ¼ of a total edge length of the visible area.

Figure 4:
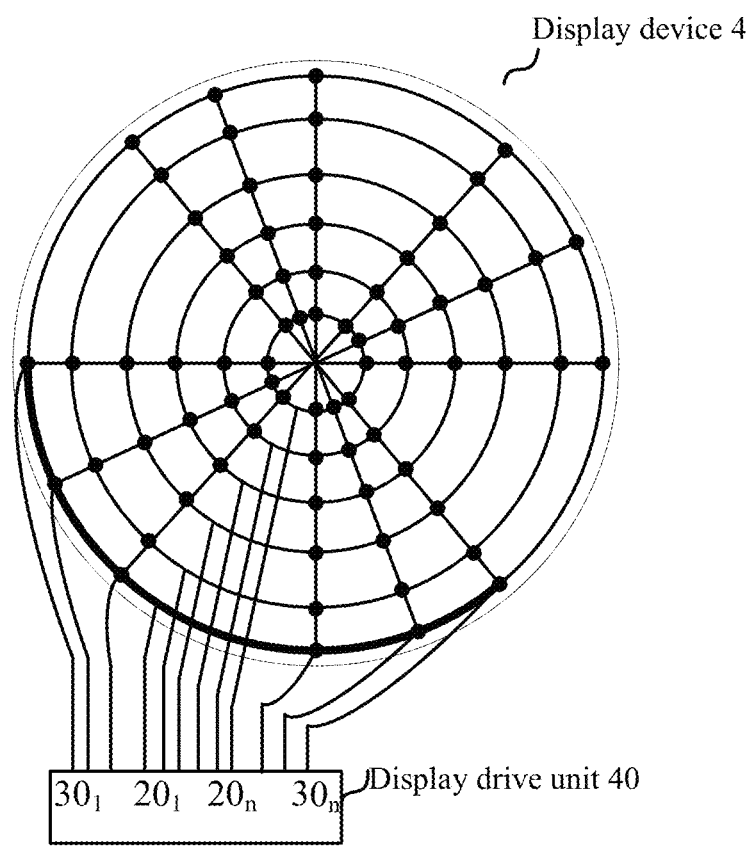
FIG. 4 is a schematic diagram illustrating a display device according to a third embodiment of the present application.

FIG. 4 is a schematic diagram illustrating a display device according to a third embodiment of the present application. In the display device 4 according to the third embodiment of the present application, each $(20_1 \ldots 20_n)$ of the plurality of first type of drive lines 20 forms a circle, and each of $(30_1 \ldots 30_n)$ the plurality of second type of drive lines 30 is a straight line. Specifically, in the example shown in FIG. 4, the plurality of first type of drive lines $(20_1 \ldots 20_n)$ are a group of concentric circles nested concentrically with the edge of the display device 4, wherein the edge of the display device 4 is the outermost edge of the group of concentric circles. Then the plurality of second type of drive lines $(30_1 \ldots 30_n)$ may approximately be a plurality of straight lines radiated outward from the common circle center of the concentric circles, the plurality of straight lines are the plurality of straight lines of the outermost circle. Accordingly, as compared with the display device 2 according to the first embodiment of the present application as shown in FIG. 2 and the display device 3 according to the second embodiment of the present application as shown in FIG. 3, by configuring all the plurality of first type of drive lines 20 as circle, it is possible to make the wiring of the drive lines perfectly adapt to the circular outer frame of the display device.

Figure 5A:
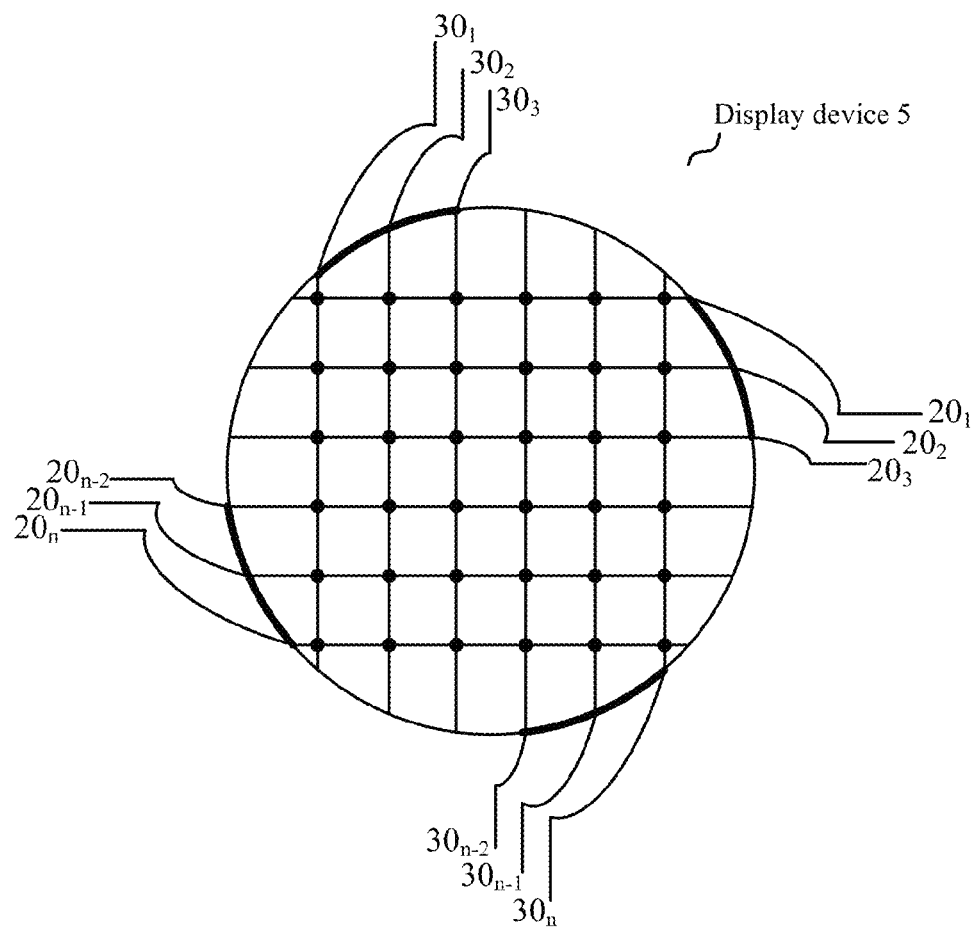
FIGS. 5A to 5C are a top surface view, a bottom surface view, and a side view illustrating a display device according to a fourth embodiment of the present application.
Figure 5B:
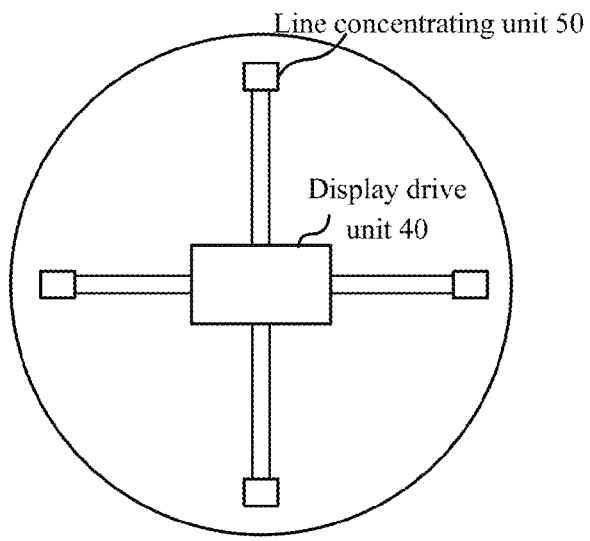
Figure 5C:
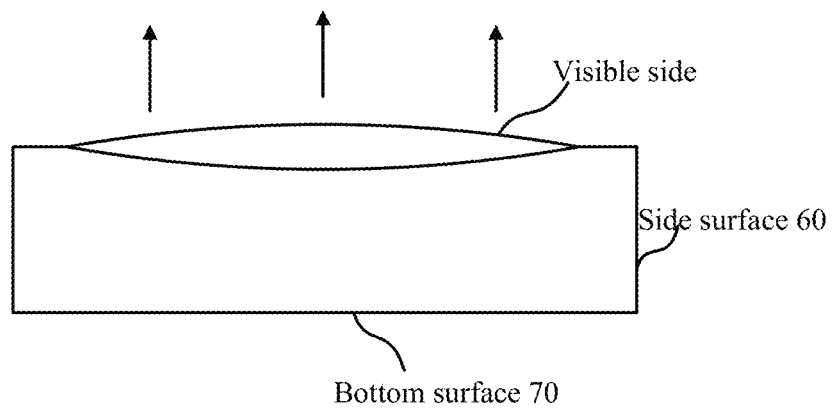

FIGS. 5A to 5C are a top surface vie(a bottom surface view, and a side view illustrating a display device according to a fourth embodiment of the present application. Specifically, FIG. 5A is a top surface view illustrating a display device according to the fourth embodiment of the present application. As can be readily appreciated, the number of the drive lines and the wiring manner as shown in FIG. 5A are merely illustrative, the display device according to an embodiment of the present application is not limited thereto. As shown in FIG. 5A, the plurality of first type of drive lines and the plurality of second type of drive lines are divided into a plurality of groups of drive lines (four groups as shown in FIG. 5A). As can be seen from FIG. 5A, by adopting such grouped wiring manner, the wiring area at the edge of the display device tends to cluster, which thereby facilitates further narrowing the frame of the display device. That is to say, in an electronic apparatus where the display device according to an embodiment of the present application is configured, the display device can adapt to the shape of the electronic apparatus as needed. Specifically, by adopting grouped configuration for the wiring of the display device, it is possible to select the edge of the display device that adapt to wiring based on the shape of the electronic apparatus as the area where wiring groups are configured, and select not to configure wiring at the edge having no wiring space of the display device based on the shape of the electronic apparatus. Herein, the edge having no wiring space of the display device may be an edge where the edge of the display device substantially overlaps with the outer frame of the electronic apparatus per se. Alternatively, the edge of having no wiring space the display device may be an edge of the electronic apparatus where the outer frame thereof is of an irregular shape and thus is inconvenient for wiring. Detailed examples will be described below with reference to the drawings.

Further, FIG. 5B is a bottom surface view illustrating a display device according to the fourth embodiment of the present application. As shown in FIG. 5B, the display device 5 further comprises a plurality of line concentrating units 50, each group of the plurality of groups of drive lines, into which the plurality of first type of drive lines and the plurality of second type of drive lines are divided, is connected to the display drive unit 40 via one of the line concentrating units 50, number of input terminals of one of the line concentrating units 50 connected with each group of the at least two groups of drive lines is M, number of output terminals connected to the display drive unit 40 is N, and M>N. In the embodiment shown in FIG. 5B, number of the input terminals by which one of the line concentrating units 50 and one group of drive lines are connected is three, and number of the output terminals connected to the display drive unit 40 is two. Adopting such wiring manner of connecting the display drive unit via the line concentrating unit after grouping, it is possible to further reduce the number of wiring needed for executing display drive. As can be readily appreciated, the display device according to an embodiment of the present application is not limited thereto, instead, the grouped group of drive lines may be directly connected to the display drive unit 40 without the line concentrating unit 50.

Furthermore, FIG. 5C is a side view illustrating a display device according to the fourth embodiment of the present application. As shown in FIG. 5C, a side of the surface where the array of display cells 10 residues is a visible side, and at least a portion of the plurality of first type of drive lines 20 and the plurality of second type of drive lines 30 and the display drive unit 40 are provided at the other side of the surface. In particular, the display drive unit 40 is located at a bottom surface 70 of the display device 5, the display device 5 further comprises a side surface 60 that connects an edge of the surface where the array of display cells 10 residues and the bottom surface 70, the plurality of first type of drive lines 20 and the plurality of second type of drive lines 30 are provided along the side surface 60. In the side view as shown in FIG. 5C, a distance from a projection, on a plane vertical to the visible direction (that is, the bottom surface 70), of part of the plurality of first type of drive lines 20 and the plurality of second type of drive lines 30 on the surface where the array of display cells 10 residues to the edge of the surface where the array of display cells 10 residues is L. The distance L meets being less than a predetermined threshold. The predetermined threshold may be set as needed by design and display requirements, for example, it may be set as ten mm, five mm, or one mm. Even in the case of grouped wiring, the distance L may be zero. That is to say, at the edge where the drive lines do not turn downward to connect the display drive unit 40, it is possible that there is no wiring for the drive lines, and at the edge of this portion, the frame other than the visible area on the surface where the array of display cells residues is the narrowest.

Figure 6A:
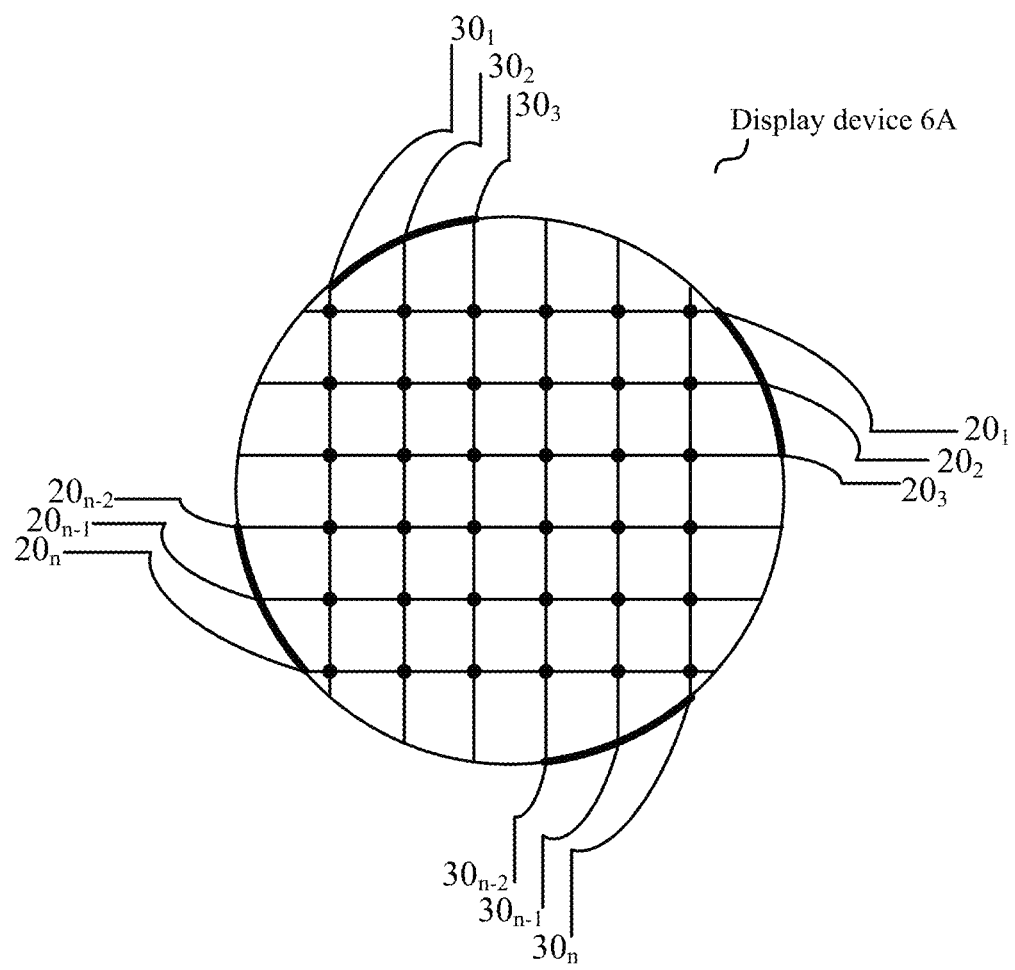
FIGS. 6A and 6B are schematic diagrams illustrating a display device according to a fifth embodiment of the present application.
Figure 6B:
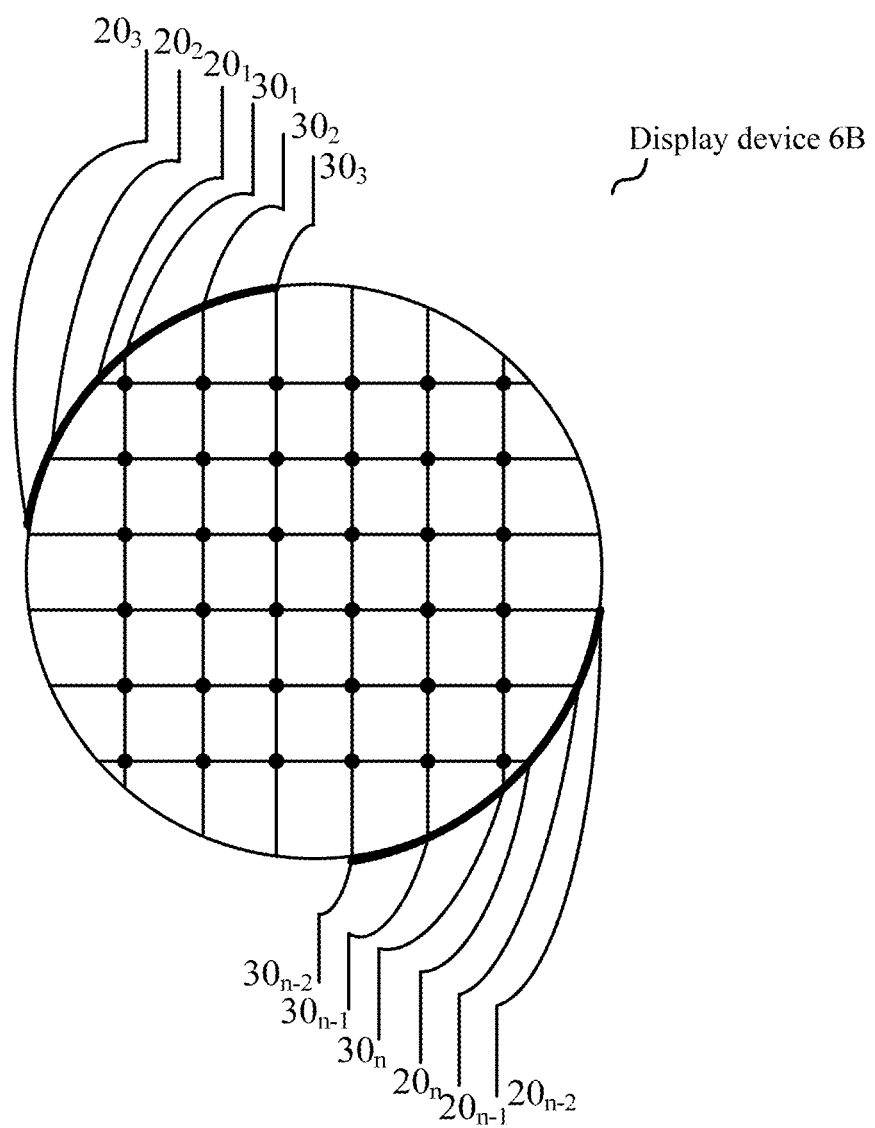

FIGS. 6A and 6B are schematic diagrams illustrating a display device according to a fifth embodiment of the present application. In the display devices 6A and 6B according to the fifth embodiment of the present application, each group into which the plurality of first drive lines and the plurality of second drive lines are divided may comprise only the first type of drive lines or the second type of drive lines, or each group into which the plurality of first drive lines and the plurality of second drive lines are divided may comprise the first type of drive lines and the second type of drive lines. Specifically, as shown in FIG. 6A, in the display device 6A according to the fifth embodiment of the present application, each group into which the plurality of first drive lines and the plurality of second drive lines are divided may comprise only the first type of drive lines (the group composed by $20_1$, $20_2$, $20_3$ and the group composed by $20_{n-2}$, $20_{n-1}$, $20_n$) or the second type of drive lines (the group composed by $30_1$, $30_2$, $30_3$ and the group composed by $30_{n-2}$, $30_{n-1}$, $30_n$). In contrast, as shown in FIG. 6B, in the display device 6B according to the fifth embodiment of the present application, each group into which the plurality of first drive lines and the plurality of second drive lines are divided may comprise the first type of drive lines (the group composed by $20_1$, $20_2$, $20_3$ $30_1$, $30_2$, $30_3$) and the second type of drive lines (the group composed by $20_{n-2}$, $20_{n-1}$, $20_n$, $30_{n-2}$, $30_{n-1}$, $30_n$). As can be seen from FIGS. 6A and 6B, adopting such grouped wiring manner, the grouping manner of the plurality of first drive lines and the plurality of second drive lines is more flexible, the drive lines can be selected to compose the group as needed by design and display requirements, without being restricted by the type of the drive lines per se.

Figure 7A:
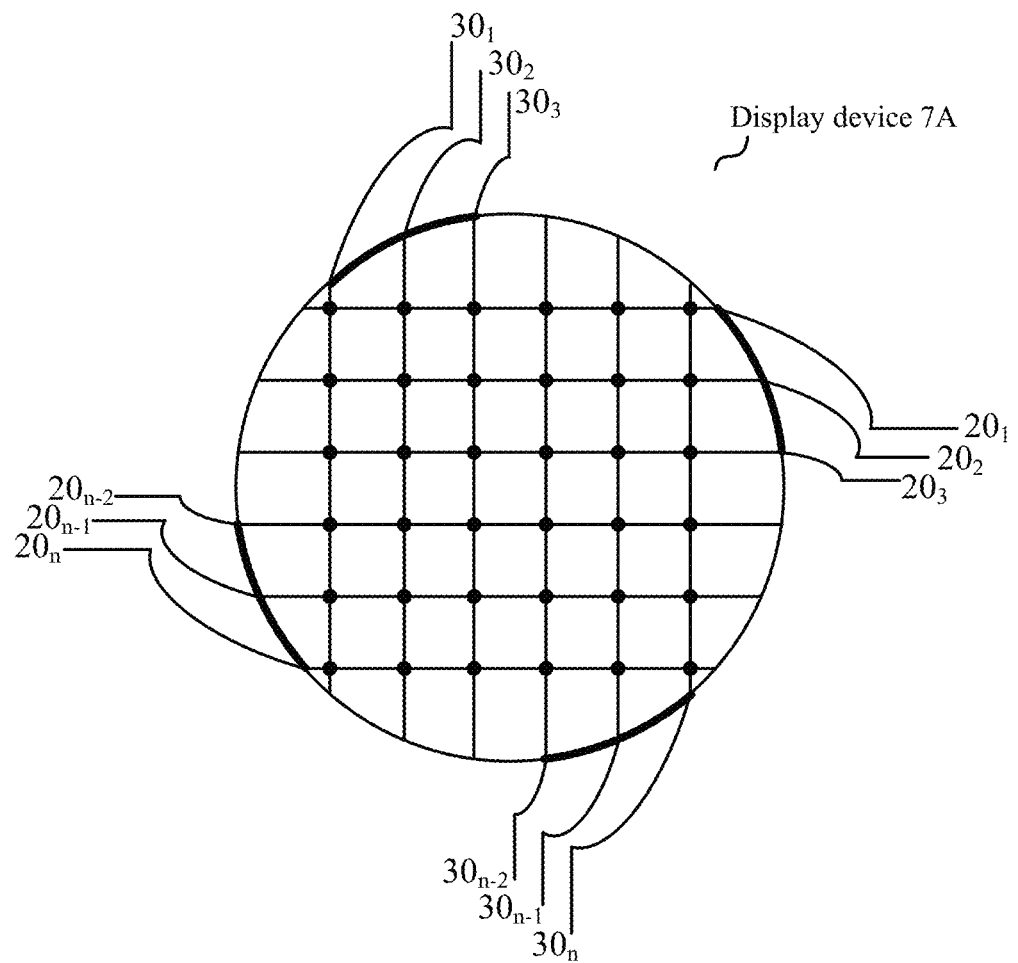
FIGS. 7A and 7B are schematic diagrams illustrating a display device according to a sixth embodiment of the present application.
Figure 7B:
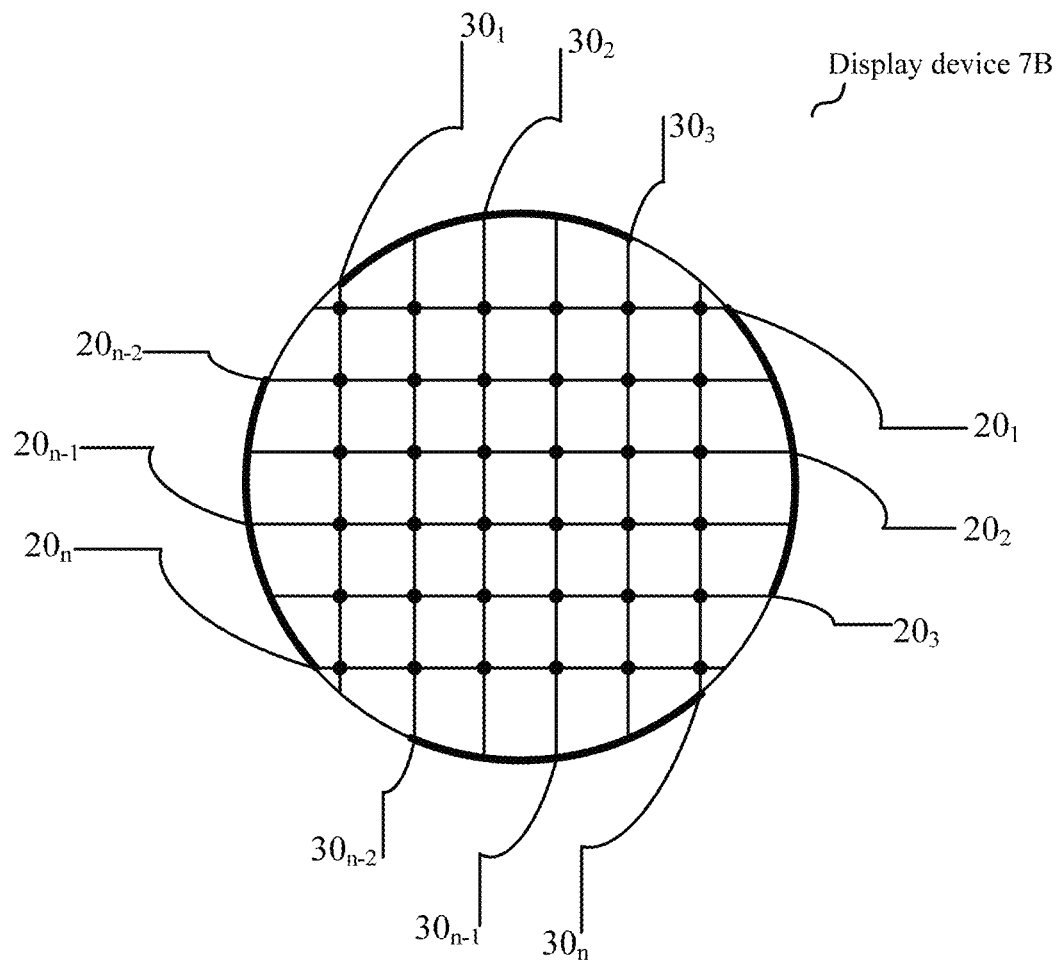

FIGS. 7A and 7B are schematic diagrams illustrating a display device according to a sixth embodiment of the present application. In the display devices 7A and 76B according to the sixth embodiment of the present application, each group into which the plurality of first drive lines and the plurality of second drive lines are divided may comprise only adjacent drive lines, or each group into which the plurality of first drive lines and the plurality of second drive lines are divided may comprise drive lines that are not adjacent. Specifically, as shown in FIG. 7A, in the display device 7A according to the sixth embodiment of the present application, each group into which the plurality of first drive lines and the plurality of second drive lines are divided may comprise only adjacent drive lines (e.g., the group composed by adjacent $20_1$, $20_2$, $20_3$; $20_{n-2}$, $20_{n-1}$, $20_n$; $30_1$, $30_2$, $30_3$; $30_{n-2}$, $30_{n-1}$, $30_n$). In contrast, as shown in FIG. 7B, in the display device 7B according to the sixth embodiment of the present application, each group into which the plurality of first drive lines and the plurality of second drive lines are divided may comprise drive lines that are not adjacent (e.g., the group composed by $20_1$, $20_3$, $20_5$: $20_{n-4}$, $20_{n-2}$, $20_n$: $30_1$, $30_3$, $30_5$; and $30_{n-4}$, $30_{n-2}$, $30_n$ that are not adjacent). As can be seen from FIGS. 7A and 7B, adopting such grouped wiring manner, the grouping manner of the plurality of first drive lines and the plurality of second drive lines is not limited to grouping the adjacent drive lines, instead it is possible to select the drive lines that are not adjacent to group as needed by design and display requirements, thus avoiding selecting the narrow frame portion of the display device to perform wiring of the drive lines.

Figure 8:
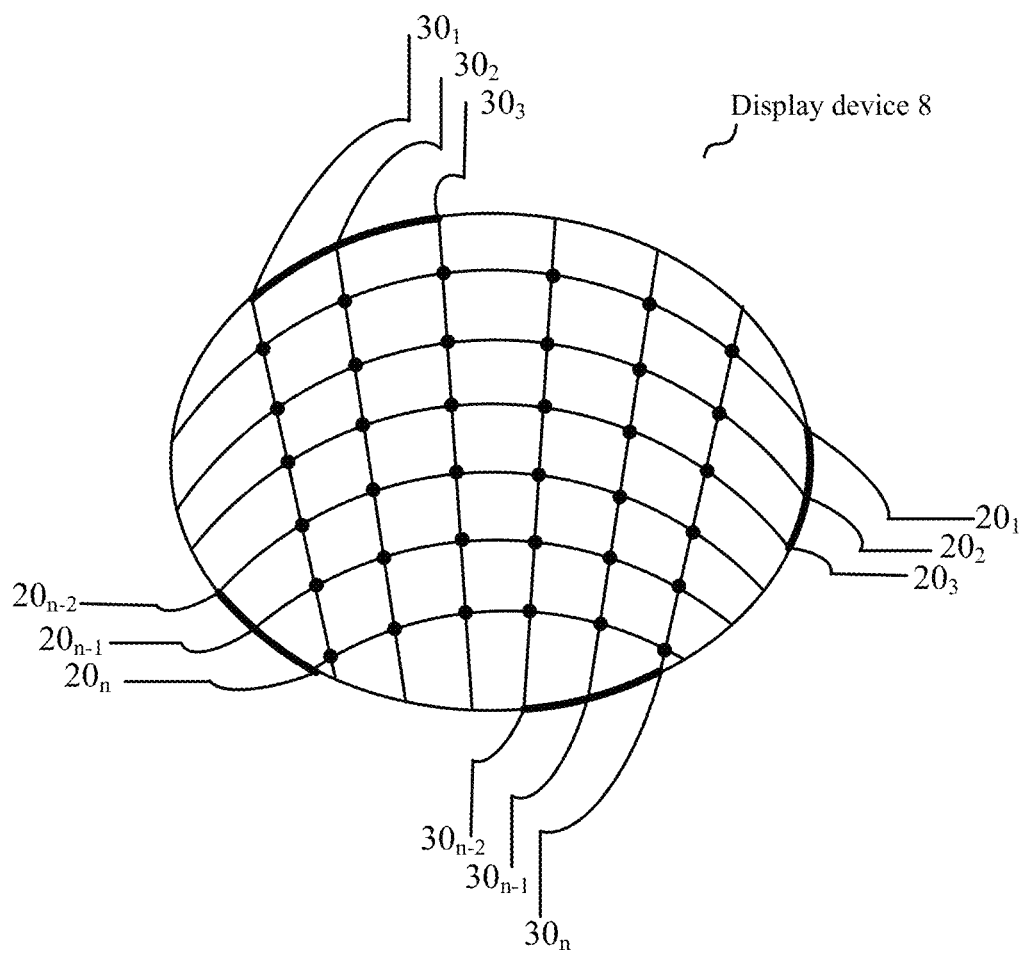
FIG. 8 is a schematic diagram illustrating a display device according to a seventh embodiment of the present application.

FIG. 8 is a schematic diagram illustrating a display device according to a seventh embodiment of the present application. In the display device 8 according to the seventh embodiment of the present application, at least one drive line in at least one group among a plurality of groups of drive lines into which the plurality of first drive lines and the plurality of second drive lines are divided is a curve. Specifically, as shown in FIG. 8A, the drive lines $20_1$, $20_2$, $20_3$, $20_{n-2}$, $20_{n-1}$, $20_n$ are curves. In addition, the plurality of first drive lines and the plurality of second drive lines are divided into a plurality of groups of drive lines (four groups as shown in FIG. 8). As can be seen from FIG. 8, adopting such manner of combination of curve configuration and grouping configuration of the drive lines can make the wiring region of the edge of the display device more tend to cluster, facilitate further narrowing the frame of the display device, and meanwhile make the wiring of the drive lines more flexibly adapt to the outer frame of the display device, as compared with the cases of simply adopting the curve configuration (as shown in FIGS. 2 to 4) and those of simply adopting the grouping configuration (as shown in FIGS. 5A to 7B).

Figure 9A:
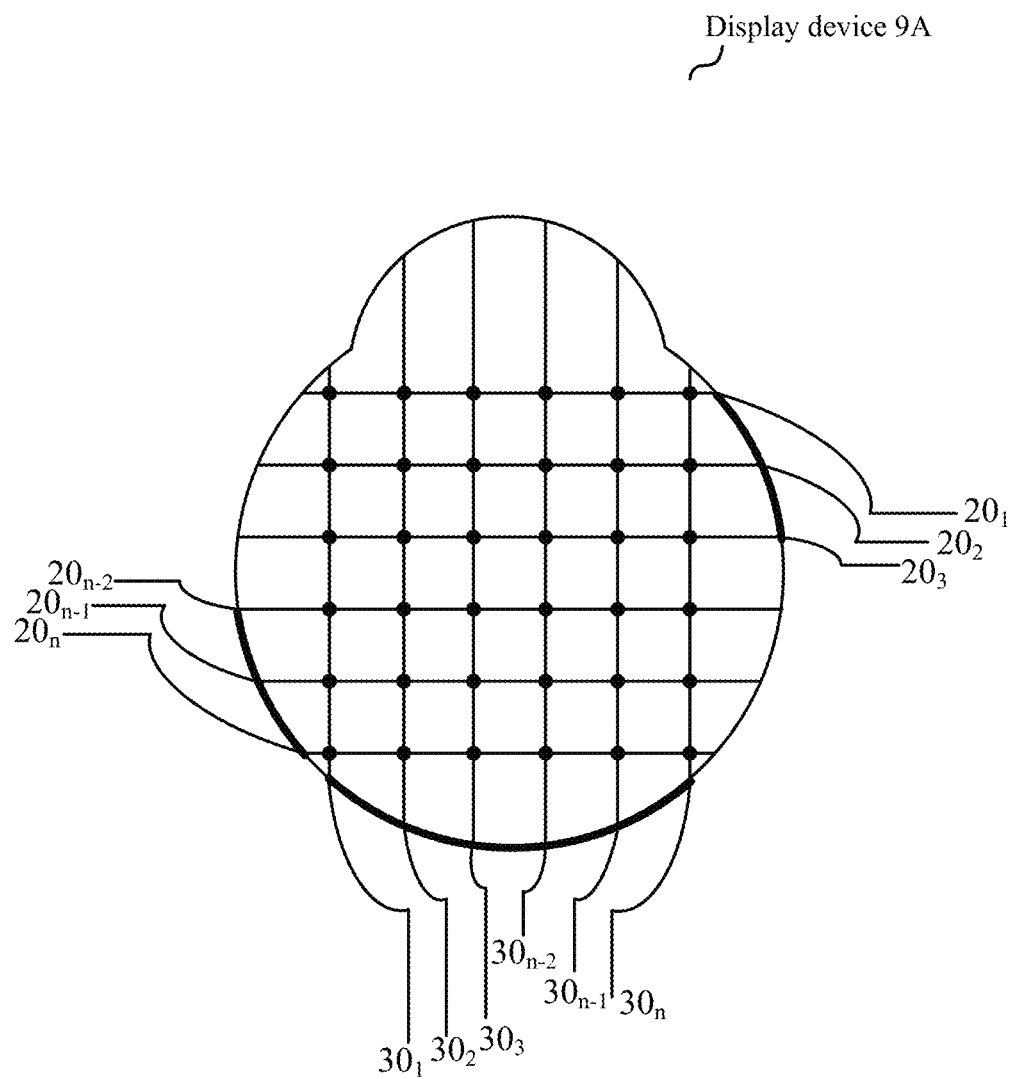
FIGS. 9A and 9B are schematic diagrams illustrating a display device according to an eighth embodiment of the present application.
Figure 9B:
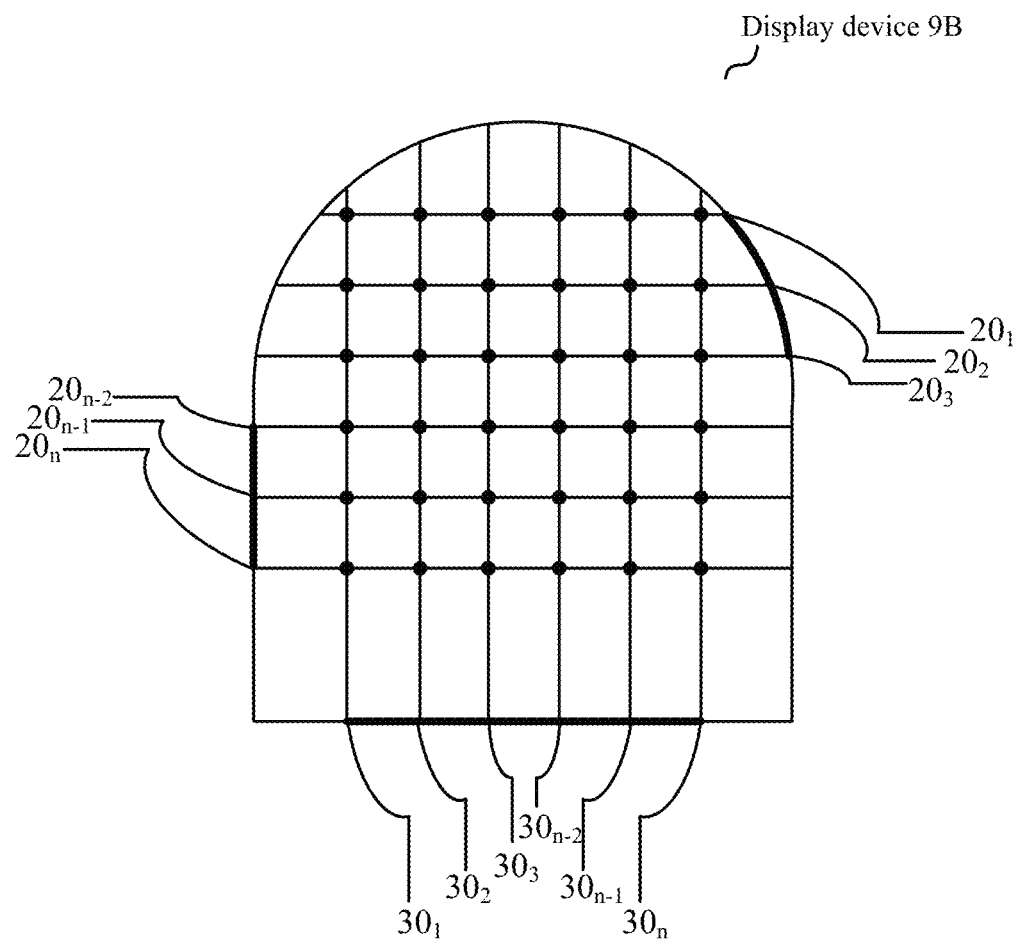

FIGS. 9A and 9B are schematic diagrams illustrating a display device according to an eighth embodiment of the present application. In the display devices 9A and 9B according to the eighth embodiment of the present application, at least part of the edge of the surface where the array of display cells 40 residues is a curve, and the edge is at least divided into a first edge portion and a second edge portion, the first edge portion and the second edge portion have different curvatures. Specifically, as shown in FIG. 9A, the edge is divided into an upper first curve edge portion and a lower second curve edge portion, the two portions have different curvatures. Likewise, as shown in FIG. 9B, the edge is divided into an upper first curve edge portion and a lower second straight line edge portion, the two portions obviously have different curvatures. As can be seen from FIGS. 9A and 9B, adopting such wiring manner, the wiring of the plurality of drive lines is not provided in the first edge portion that needs to implement containing the narrow frame of the display device correspondingly, the corresponding drive lines, $30_1$, $30_2$, $30_3$, $30_{n-2}$, $30_{n-1}$, $30_n$ are provided in group in the second edge portion that does not need to implement the narrow frame, so that the wiring can easily adapt to the frame shape according to different requirements. More specifically, for example, when the display device as shown in FIGS. 9A and 9B is applied to an electronic apparatus like a smart watch, an edge where the dial of the smart watch is connected with the strap is the second edge portion that does not need to implement the narrow frame, the edge where the dial of the smart watch is not connected with the strap is the first edge portion. In the example shown in FIGS. 9A and 9B, one of the upper edge portion and the lower edge portion is selected as the portion to arrange the wiring group. As can be readily appreciated, the present application is not limited thereto, it is possible to select one of the left edge portion and the right edge portion as the portion to arrange the wiring group.

Hereinafter, an electronic apparatus that adopts the display device described above will be further described with reference to FIGS. 10 to 22B.

Figure 10:
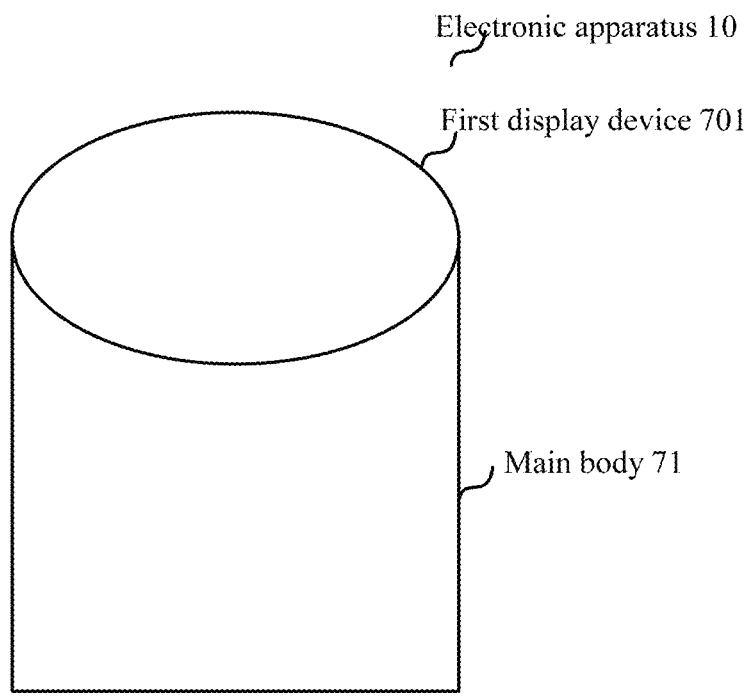
FIG. 10 is a structural block diagram briefly illustrating an electronic apparatus according to an embodiment of the present application.

FIG. 10 is a structural block diagram briefly illustrating an electronic apparatus according to an embodiment of the present application. As shown in FIG. 10, the electronic apparatus 10 according to an embodiment of the present application comprises a main body 71 in which a process unit may be set (not shown) to execute control processing of the electronic apparatus 10. A first display device 701 according to an embodiment of the present application is at least partially provided within the main body 71 and configured to execute display of a first image. The first display device 701 may be any of the display device described above with reference to FIGS. 1 to 9B. Specifically, the first display device 701 comprises an array of display cells, a plurality of first type of drive lines and a plurality of second type of drive lines, and a display drive unit. The array of display cells comprises a plurality of display subunits and is set within the main body 71, that is to say, a visible area of the first display device 701 is provided within the main body 71; each of the plurality of first type of drive lines intersects with each of the plurality of second type of drive lines, intersection thereof corresponds to each display subunit of the plurality of display subunits, to provide a display drive signal for each display subunit. The display drive unit is connected with the plurality of first type of drive lines and the plurality of second type of drive lines, to provide a display drive signal for the plurality of first type of drive lines and the plurality of second type of drive lines. As described above, the plurality of first type of drive lines and the plurality of second type of drive lines are divided into at two groups of drive lines, each group of the at least two groups of drive lines is connected to the display drive unit. That is to say, the first display device 701 adopts a grouped wiring manner, thereby the wiring area provided at the edge of the display device tends to cluster, which facilitates further narrowing the frame of the display device, and meanwhile makes the wiring of the drive lines more flexibly adapt to the different frame shapes of the display device.

Figure 11:
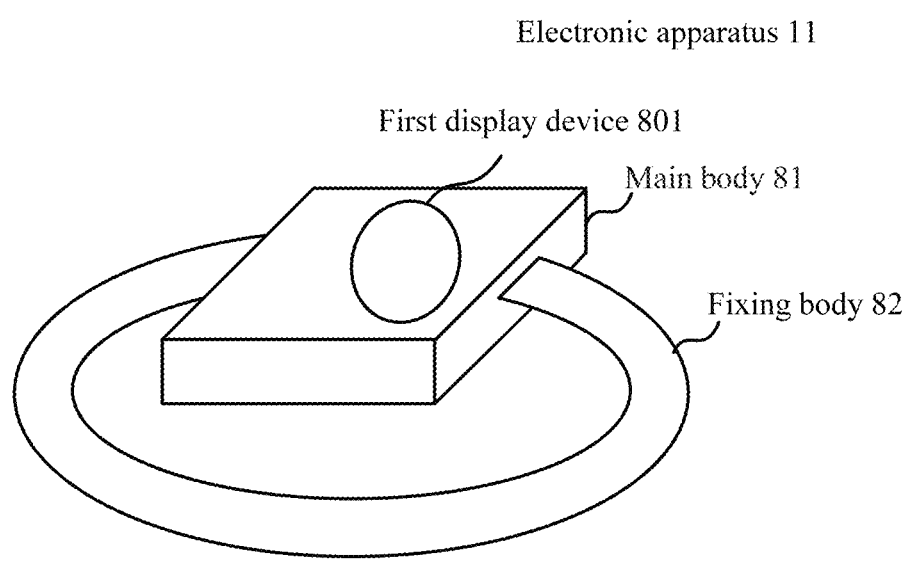
FIG. 11 is a schematic diagram illustrating an electronic apparatus according to a ninth embodiment of the present application.

FIG. 11 is a schematic diagram illustrating an electronic apparatus according to a ninth embodiment of the present application. As shown in FIG. 11, the electronic apparatus 11 according to the ninth embodiment of the present application further comprises a fixing body 82 connected with the main body 81 and configured to fix a position relationship relative to a user of the electronic apparatus 11. The fixing body 82 comprises at least a fixed state in which the fixing body can serve as at least a portion of an annular space or an approximate annular space that meets a first predetermined condition, the annular space or the approximate annular space can surround periphery of a columnar body that meets a second predetermined condition. In an embodiment of the present application, the fixing body 82 and the main body 81 form a closed annular space, wherein the fixing body 82 and the main body 81 constitute a portion of the annular space, respectively. In another embodiment of the present application, the fixing body 82 and the main body 81 form an approximate annular space with a small opening, wherein the fixing body 82 and the main body 81 constitute a portion of the approximate annular space, respectively. Specifically, the electronic apparatus 8 may be a wearable electronic apparatus like a smart watch or a head-mounted electronic apparatus. In an embodiment of the present application, the main body 81 is a dial portion of a smart watch, and the fixing body 82 is a strap portion of the smart watch. The annular space or the approximate annular space formed by the fixing body 82 and the main body 81 can surround the wrist of the user of the smart watch which serves as the columnar body, and a diameter of the annular space or the approximate annular space is greater than a diameter of the user's wrist and smaller than a diameter of the user's fist. Further, the annular space or the approximate annular space may be formed by the fixing body 82 alone. The main body 81 may be provided on the fixing body 82 (i.e., the main body 81 is attached to the fixing body 82 in the manner of surface contact), so that the fixing body 82 alone forms the annular space or the approximate annular space that surrounds the columnar body. The fixing body 82 is arranged with a fixing mechanism like hasps, snaps, zippers and so on.

Likewise, the first display device 801 may be any of the display device described above with reference to FIGS. 1 to 9B.

Figure 12A:
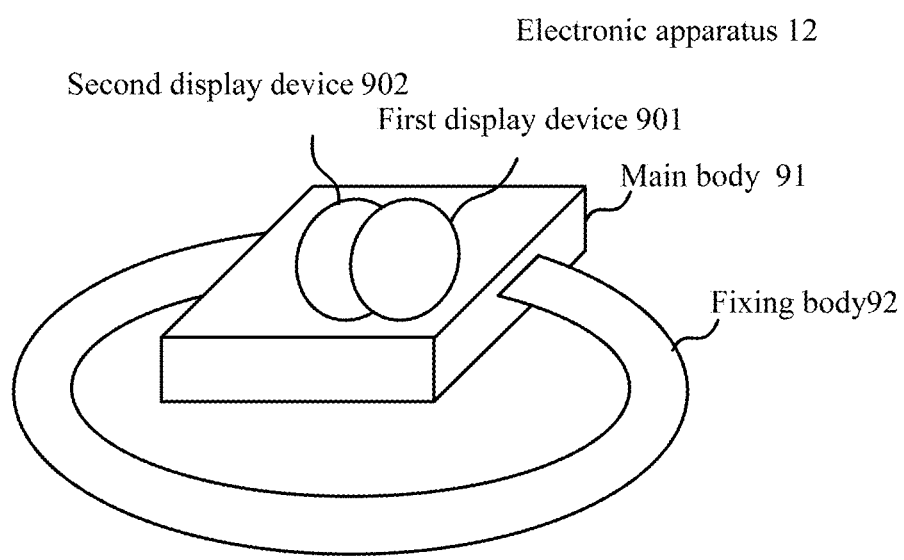
FIGS. 12A and 12B are schematic diagrams illustrating an electronic apparatus according to a tenth embodiment of the present application.
Figure 12B:
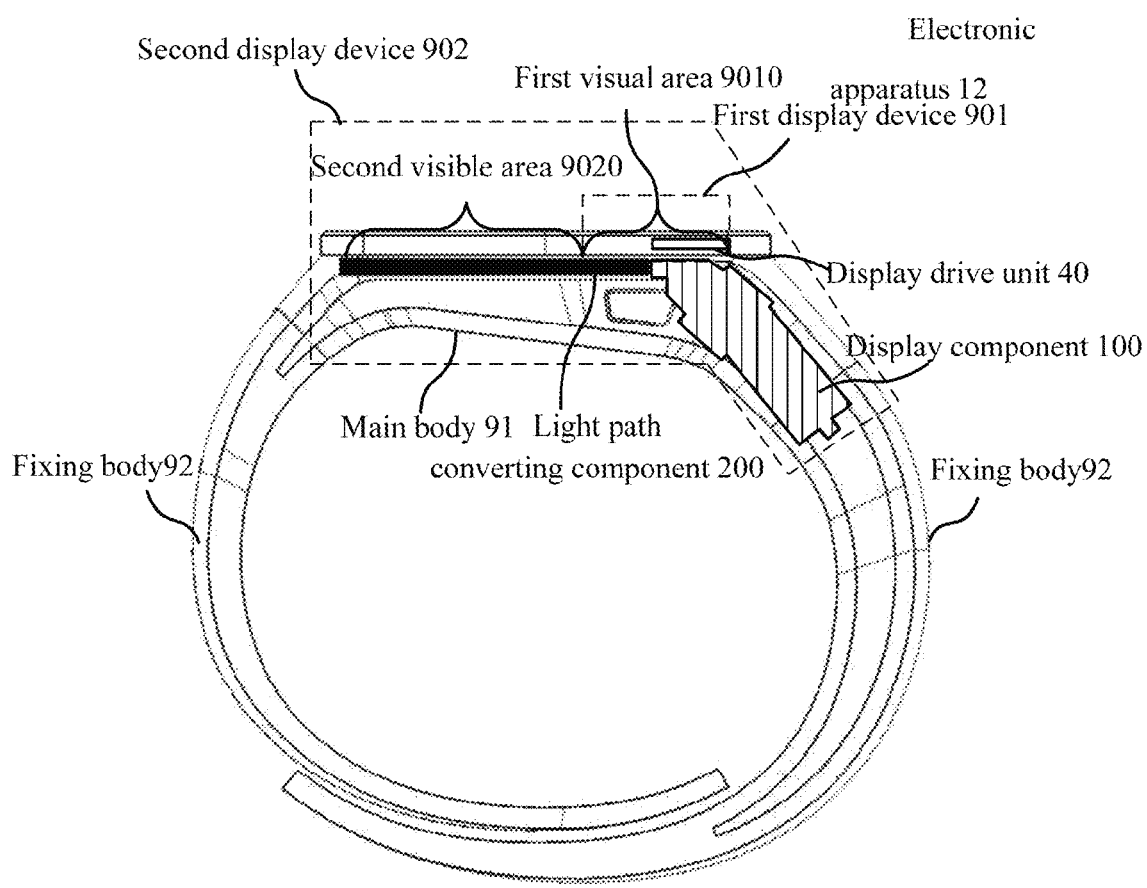

FIGS. 12A and 12B are schematic diagrams illustrating an electronic apparatus according to a tenth embodiment of the present application. As shown in FIG. 12A, the electronic apparatus 12 according to the tenth embodiment of the present application further comprises a second display device 902 configured to execute display of the second image, provided within the main body 91 and/or the fixing body 92, wherein the first display device 901 and the second display device 902 are different types of display device. The second display device 902 will be further displayed below with reference to FIGS. 13 to 18.

As shown in FIG. 12B, the first display device 901 has a first visual area 9010, the second display device 902 has a second visible area 9020, an edge by which the first visible area 9010 and the second visible area 9020 border upon each other is a curve. The first visible area 9010 is a surface that exits light of the array of display cells 10, so that a viewer at a particular position perceives the second image. The particular position and the display drive unit 40 are located at two sides of a plane on which the visible area 9010 resides, respectively.

Since the first display device 901 is any of the display device described above with reference to FIGS. 1 to 9B, it adopts a grouped and/or curve wiring manner, so that the edge thereof can easily adapt to any edge shape of an area adjacent to the second visible area of the second display device 902.

Figure 13:
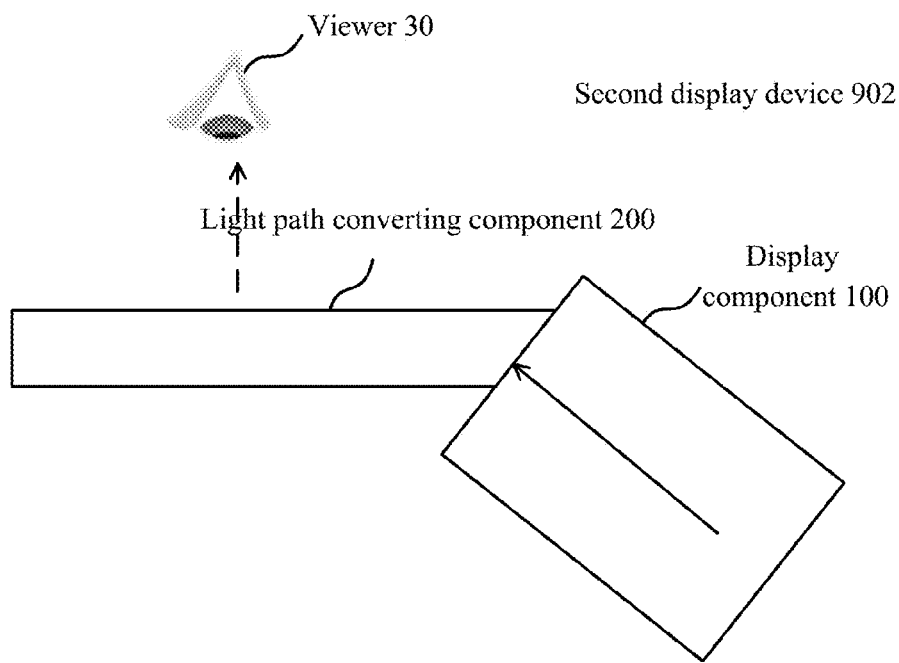
FIG. 13 is a structural block diagram briefly illustrating a display device according to an embodiment of present application.

In addition, as shown in FIG. 12B, adopting the grouped and/or curve wiring manner, the drive lines of the first display device 904 are provided at the edge portion where the main body 91 and the fixing body 92 are connected (i.e., the first edge portion), whereas no drive lines are provided at the edge portion where the first display device 901 and the second display device 902 border upon each other, FIG. 13 is a structural block diagram briefly illustrating the second display device 902 according to an embodiment of present application. As shown in FIG. 13, the second display device 902 comprises a display component 100 and a light path converting component 200. The display component 100 is configured to output initial light corresponding to the second image to be displayed by the second display device 902 (light indicated by the solid-line arrow shown in FIG. 13). The light path converting component 200 is configured to receive the initial light corresponding to the second image from the display component 100, and perform light path conversion on the initial light corresponding to the second image to thereby form a virtual image corresponding to the second image, wherein the virtual image corresponding to the second image can be perceived by a viewer at a particular position, and a size of the virtual image perceived is greater than a display size of the display component 100.

Specifically, in an embodiment of the present application, the display component 100 may be for example a self-luminous type display component like an organic light emitting diode (OLED) display, may also be a backlight type display component like a liquid crystal display. The light path converting component 200 may comprise lens group for collimating and amplifying an image and a waveguide chip or a flexible waveguide for changing an exit direction of the image and so on. Further, a virtual image corresponding to the second image can be perceived by a viewer 30 at a particular position. Specifically, image can be formed at a particular position through the light path converting component 20 as needed by design, for example, as shown in FIG. 13, the particular position may be either side with respect to the light path converting component 200. As such, the second display device 902 according to the embodiment of the present application as shown in FIG. 13 can be not restricted by size of the electronic apparatus equipped with the display device 902, it can provide image or video display with larger size and higher resolution to the viewer at a particular position as needed by design.

Figure 14:
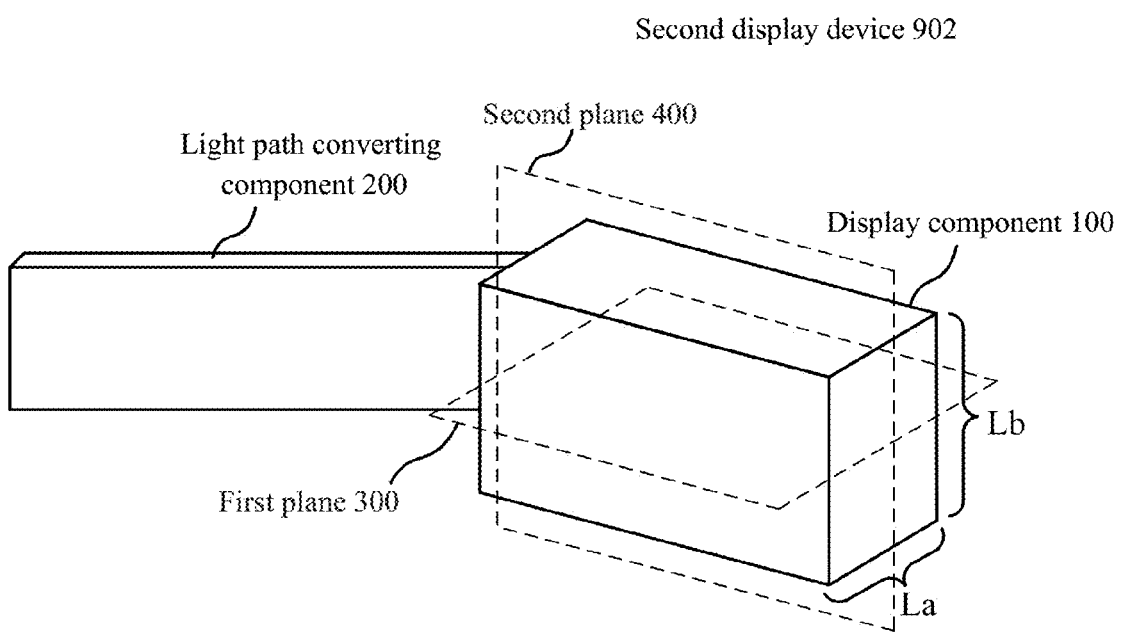
FIG. 14 is a structural block diagram illustrating a display device according to an eleventh embodiment of present application.

FIG. 14 is a structural block diagram illustrating a display device according to an eleventh embodiment of present application. For simplicity of the illustration, FIG. 14 only illustrate the second display device 902 that comprises the display component 100 and the light path converting component 200, internal configurations of the display component 10 and the light path converting component 20 as well as the light path are not shown in FIG. 14.

As illustrated in FIG. 14, light that forms the second image in the display component 100 is on a first plane 300, light that forms the virtual image corresponding to the second image and exits from the light path converting component 200 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the second display device 902 is provided within a wearable electronic apparatus, for example, when the electronic apparatus is smart glasses, the display component 100 is provided within a frame at one side (i.e., glass leg) of the smart glasses, it is such configured so that thickness of the frame within which the display component 100 is provided is thinner. Similarly, when the electronic apparatus is a smart watch, the display component 100 is provided within a wrist strap at one side of the smart watch, and it is such configured no that thickness of the wrist strap within which the display component 100 is provided is thinner. Accordingly, the display component 100 according to the second exemplary embodiment of the present application achieves a thickness reduction in a specific direction, and thereby achieves a thickness reduction in a specific direction of the second display device 902.

Figure 15A:
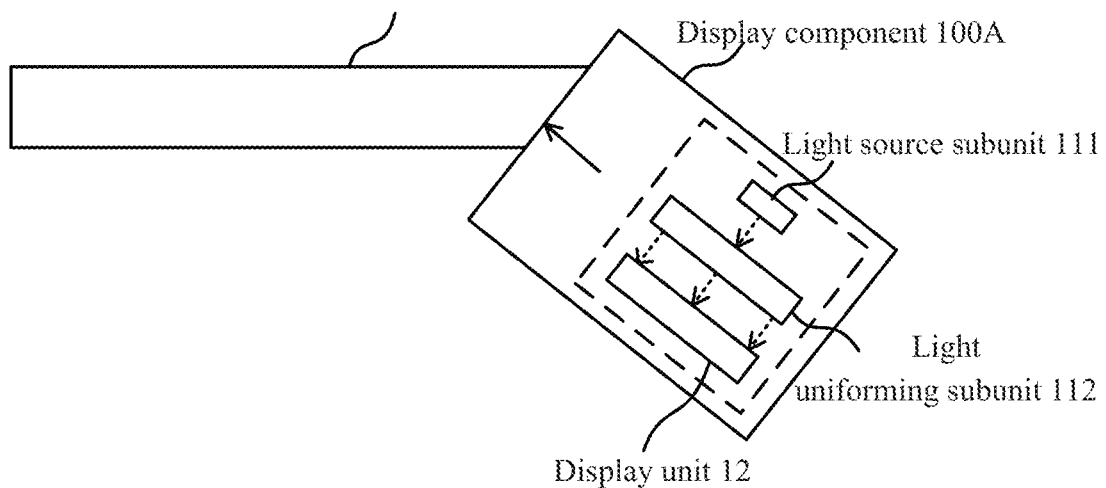
FIGS. 15A and 15B are structural block diagrams illustrating a display device according to a twelfth embodiment of the present application.
Figure 15B:
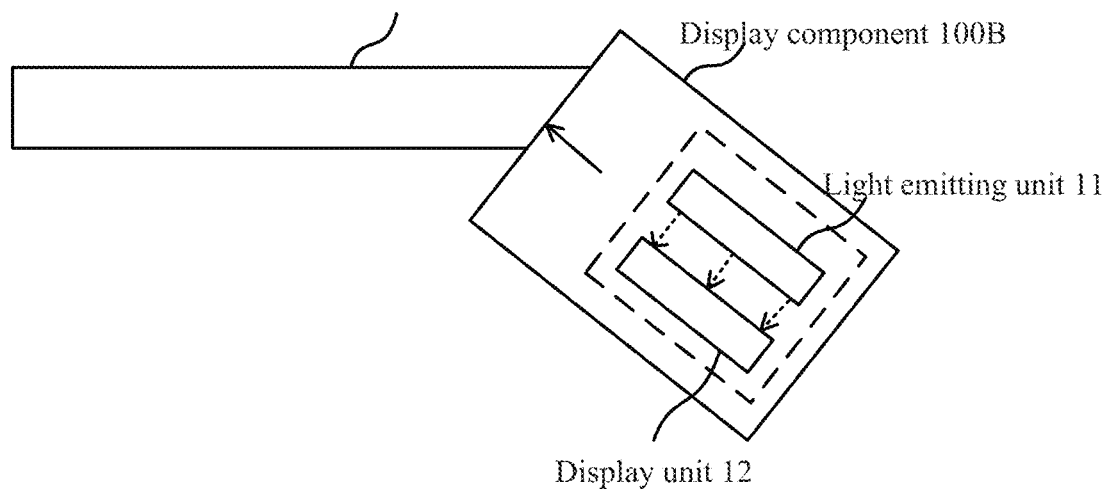

FIGS. 15A and 15B are structural block diagrams illustrating a display device according to a twelfth embodiment of the present application. Similar to the display device according to the eleventh embodiment of the present application as shown in FIG. 14, the second display device 902 according to the eleventh embodiment of the present application also comprises a display component 100 and a light path converting component 200. As shown in FIG. 15A, the display component 100A specifically comprises a light source subunit 111, a light uniforming subunit 112, and a display unit 12, wherein the light uniforming subunit 112 sets the light source subunit 111 overlapped in an emission direction of the initial light corresponding to the second image, and uniforms a point light source emitted by the light source subunit 111 as backlight. Different than that, as shown in FIG. 15B, in the second display device 902, the display component 100B specifically comprises a light emitting unit 11 and a display unit 12. The light emitting unit 1 is configured to generate and emit plane backlight (light indicated by the dotted-line arrow shown in FIG. 15B), which is on the first plane as described with reference to FIG. 14. The display unit 12 is provided within an irradiation area of the backlight, and configured to generate the initial light corresponding to the second image based on the second image (e.g. light indicated by the solid-line arrow shown in FIG. 15B).

Therefore, in the second display device 902 according to the twelfth embodiment of the present application as shown in FIG. 15B, a combination manner of a single point light source and an optical light uniforming system as shown in FIG. 15A is replaced with a single light emitting unit 11 that emits plane backlight, so that thickness of the display component 10 in the second display device 902 according to the ninth exemplary embodiment of the present application is reduced in the emission direction of the initial light corresponding to the second image.

Figure 16:
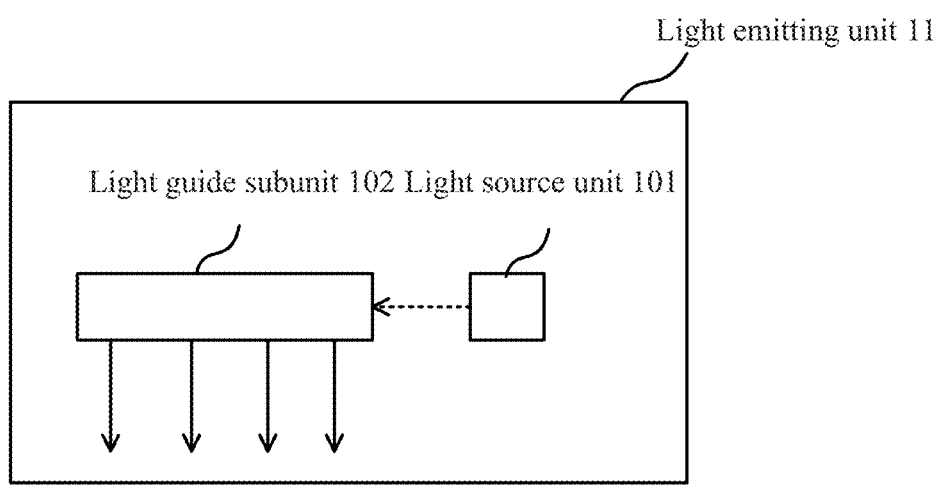
FIG. 16 is a structural block diagram illustrating a light emitting unit in a display device according to a thirteenth embodiment of the present application.

FIG. 16 is a structural block diagram illustrating a light emitting unit in a display device according to a thirteenth embodiment of the present application. The light emitting unit 11 as shown in FIG. 16 may be an implementation of the light emitting unit that emits plane backlight in the second display device 902 according to the twelfth embodiment of the present application as shown in FIG. 15B. The light emitting unit 11 in the display device according to the thirteenth exemplary embodiment of the present application comprises a light source unit 101 and a light guide subunit 102 in particular. Specifically, the light source subunit 101 is configured to emit light towards a second direction (light indicated by the dotted-line arrow shown in FIG. 16), the light guide subunit 102 is provided within an irradiation area of the light, the light transmits through the light guide subunit 102 to form the backlight (light indicated by the solid-line arrow shown in FIG. 16). That is, the light guide subunit 102 converts light emitted by the light source subunit 101 which serves as a single point light source into plane backlight, which is located on the first plane described above with reference to FIG. 14. In an embodiment of the present application, the light source subunit 101 may be an LED light source, and the light emitting unit 11 may further comprise an optical film. Thickness of the whole light emitting unit 11 is controlled for example within 1.5 mm, and the emission angle of the plane backlight converted by the light guide subunit 102 is controlled within 14 degrees, that is, an maximum angle between an exit direction of the backlight formed by the light guide subunit 102 and the second direction is 7 degrees. Therefore, the exit direction of the plane backlight converted by the light guide subunit 102 approximately can be considered as in the same direction (i.e., the second direction), which avoids the generation of stray light that exits towards a direction different than the second direction.

Therefore, in the light emitting unit 11 of the display device according to the thirteenth embodiment of the present application, the light emission direction of the light source subunit 101 is different than the light emission direction of the light converted by the light guide subunit 102 (i.e., in a direction vertical to the emission direction of the backlight, the light source subunit 101 is provided at a side of the light guide subunit 102), so that in comparison with the case of providing the light source subunit and the light guide subunit overlapped in the emission direction of the backlight, thickness of the display component 10 in the display device 3 according to the thirteenth embodiment of the present application is reduced in the emission direction of the initial light corresponding to the second image.

Figure 17:
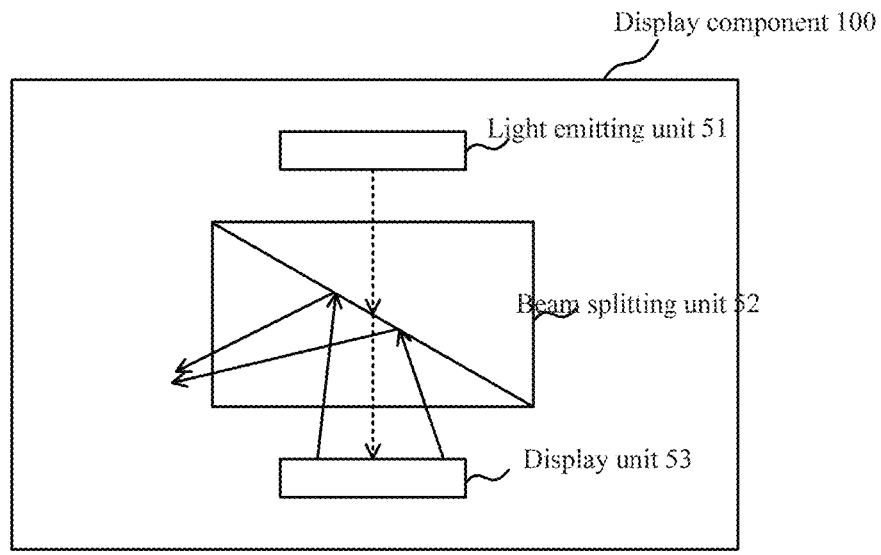
FIG. 17 is a structural block diagram illustrating a display component in a display device according to a fourteenth embodiment of the present application.

FIG. 17 is a structural block diagram illustrating a display component in a display device according to a fourteenth embodiment of the present application. As shown in FIG. 17, the display component 100 in the display device according to the fourteenth embodiment of the present application comprises a light emitting unit 51, a display unit 52, and a beam splitting unit 53. Specifically, the light emitting unit 51 is configured to emit backlight (light indicated by the dotted-line arrow shown in FIG. 17). As described above, the light emitting unit 51 may be a light emitting unit that emits plane backlight as described above with reference to FIGS. 15 and 16. The backlight from the light emitting unit 51 transmits through the beam splitting unit 53. In an embodiment of the present application, the beam splitting unit 53 is a polarization beam splitter (PBS). P-polarized backlight emitted by the light emitting unit 51 transmits through the PSB that serves as the beam splitting unit 53, to illuminate the display unit 52. The display unit 52 is provided within an irradiation area of the backlight, and configured to generate the initial light corresponding to the second image based on the second image (light indicated by the solid-line arrow shown in FIG. 17). Further, the initial light corresponding to the second image from the display unit 52 (after being modulated as S-polarized light) is reflected at the PBS which serves as the beam splitting unit 53, to be guided to the light path converting component via the beam splitting unit 53.

Figure 18:
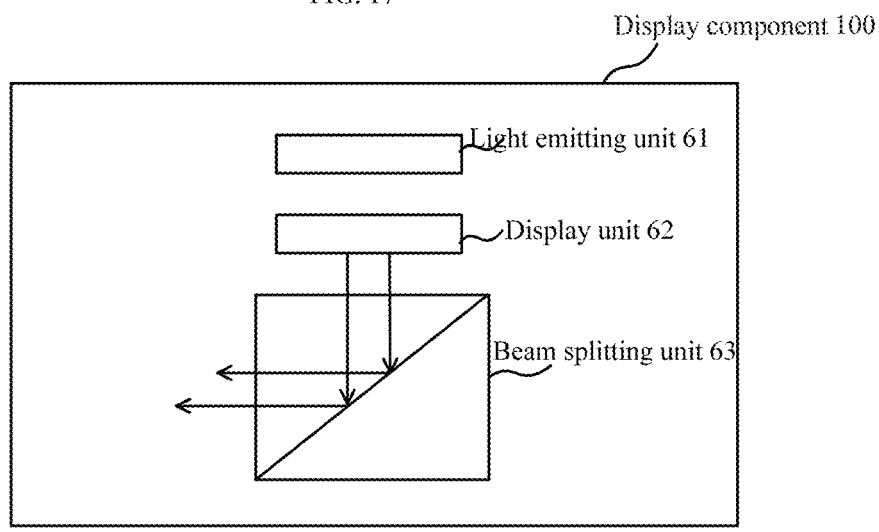
FIG. 18 is a structural block diagram illustrating a display component in a display device according to a fifteenth embodiment of the present application.

FIG. 18 is a structural block diagram illustrating a display component in a display device according to a fifteenth embodiment of the present application. As shown in FIG. 18, the display component 100 in the display device according to the fifteenth exemplary embodiment of the present application comprises a light emitting unit 61, a display unit 62, and a beam splitting unit 63. Specifically, the display unit 62 is configured to generate a display signal corresponding to the second image based on the second image. The light emitting unit 61 is configured to generate the initial light corresponding to the second image based on the display signal. That is, the light emitting unit 61 and the display unit 62 in the display device according to the fifteenth embodiment of the present application may be implemented as a self-luminous type OLED display device, the display unit 62 is a control unit that generates a display drive signal based on the fifteenth image to be displayed, the light emitting unit 61 is a self-luminous layer that executes emitting display based on the received display drive signal. Similar to the case described with reference to FIG. 17, the beam splitting unit 63 is configured to guide the initial light corresponding to the second image from the display unit to the light path converting component. In an embodiment of the present application, the beam splitting unit 63 is a polarization beam splitter (PBS).

Therefore, in the display component 100 of the display device according to the fifteenth embodiment of the present application, the display unit and the light emitting unit are integrally provided on one side of the beam splitting unit, so that a size of the display device in the direction of generating the initial light is smaller than a size of display device in the direction of generating the initial light in the case where the display unit and the light emitting unit are integrally provided on both sides of the beam splitting unit (the case shown with reference to FIG. 17).

Figure 19:
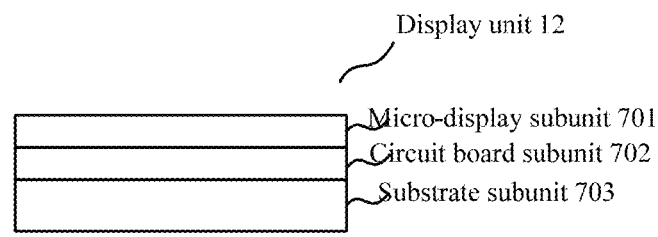
FIG. 19 is a structural block diagram illustrating a display unit in a display device according to a sixteenth embodiment of the present application.

FIG. 19 is a structural block diagram illustrating a display unit in a display device according to a sixteenth embodiment of the present application. The display unit 12 shown in FIG. 19 may be applied to the display component described with reference to FIGS. 15 to 18. As shown in FIG. 19, the display unit 12 comprises a micro-display subunit 701, a circuit board subunit 702, and a substrate subunit 703. Specifically, the micro-display subunit 701 is configured with an array of a plurality of pixel cells, each pixel cell being used for generating the initial light corresponding to the second image. The circuit board subunit 702 is configured to provide a control signal based on the second image to control the pixel cells in the micro-display subunit 701 to generate the initial light corresponding to the second image. The substrate subunit 703 is configured to arrange the micro-display subunit 701 and the circuit board subunit 702 thereon. Flexural strength and fracture toughness of the substrate subunit 703 may be denoted by the following equations:

$$\sigma_f = \sqrt{\frac{2E\Upsilon_f}{C}} \quad \text{(Equation 1)}$$

$$K_{ZC} = \sqrt{2Z\Upsilon_f} \quad \text{(Equation 2)}$$

where $\sigma_f$ is flexural strength, $K_{ZC}$ is fracture toughness, E is elastic modulus, $\Upsilon_f$ is fracture energy, and C is crack size. As can be seen from the above Equations 1 and 2, in order to improve strength of the material, fracture energy and elastic modulus must be increased, to reduce fracture size. To achieve toughness of the material, fracture energy and elastic modulus must be increased. It is known that the substrate subunit is typically made from metal material like aluminum, which always reaches a thickness of 1.6 mm. Elastic modulus of the non-metallic material, like ceramic material, is much larger than that of the metals, often higher by one to several times.

Thus, in the display unit of the display device according to the sixteenth embodiment of the present application, the substrate subunit 703 is made from non-metallic material that meets a predetermined intension, so that thickness of the substrate subunit is lower than that of the substrate subunit 703 made from metallic material that meets a predetermined intension (e.g., as low as 0.25 mm).

Figure 20A:
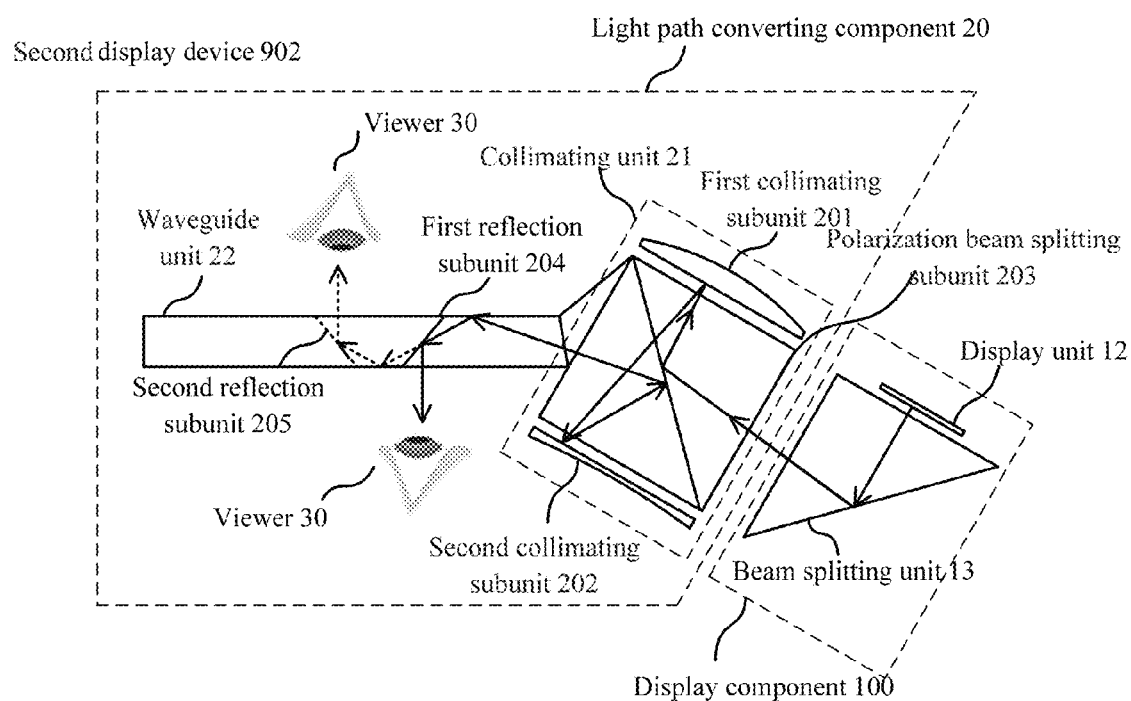
FIGS. 20A and 20B are structural block diagrams illustrating a display device according to a seventeenth embodiment of the present application.
Figure 20B:
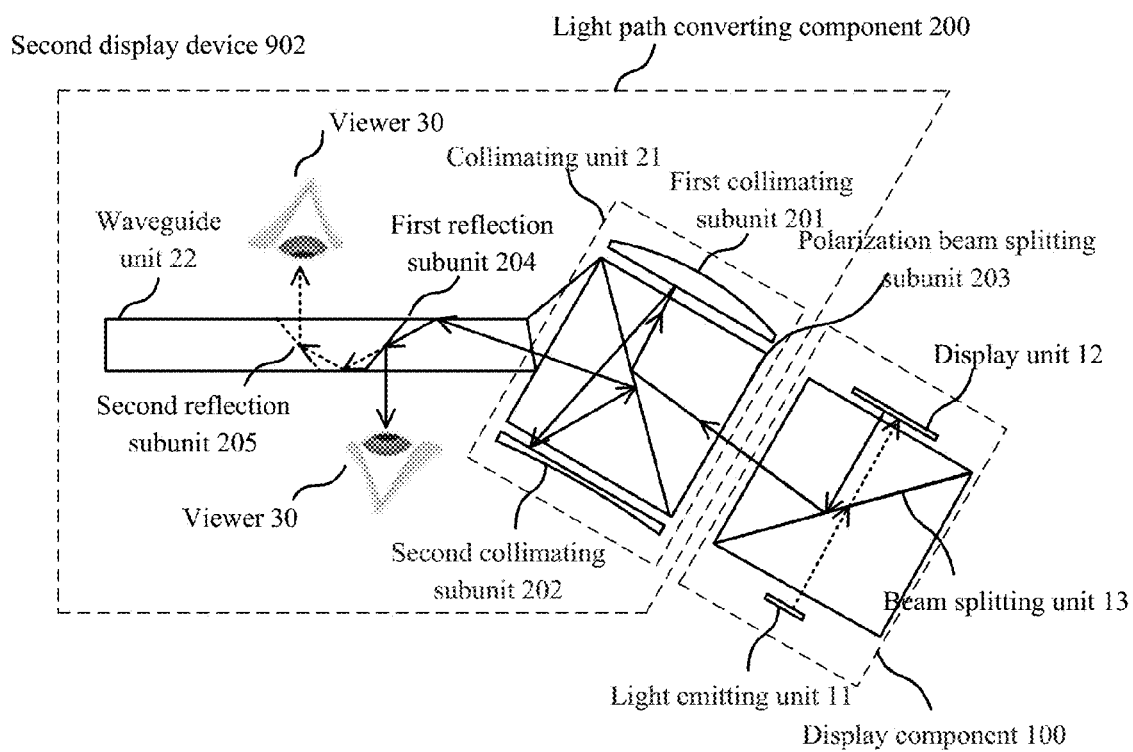

FIGS. 20A and 20B are structural block diagrams illustrating a display device according to a seventeenth embodiment of the present application. Similar to the display device described with reference to FIG. 13, the display device according to the seventeenth embodiment of the present application as shown in FIGS. 20A and 20B also comprises a display component 100 and a light path converting component 200.

Specifically, the display component 100 comprises a display unit 12 and a beam splitting unit 13 (as shown in FIG. 20A), this type of display component has already been described above with reference to FIG. 18. Alternatively, the display component 100 comprises a light emitting unit 11, a display unit 12, and a beam splitting unit 13 (as shown in FIG. 20B), this type of display component has already been described above with reference to FIG. 17. Here, repeated descriptions of the display component 100 and its light path will be omitted.

As shown in FIGS. 20A and 20B, the light path converting component unit 200 further comprises a collimating unit 21 and a waveguide unit 22, the collimating unit 21 is configured to collimate the initial light corresponding to the second image from the display component 10 into collimated light corresponding to the second image, and lead the same into the waveguide unit. Specifically, the collimating unit 21 comprises a first collimating subunit 201 and a second collimating subunit 202 provided opposite to each other, and a polarization beam splitting subunit 203 provided between the first collimating subunit 201 and the second collimating subunit 202, the initial light corresponding to the second image from the display component 100 is reflected by the polarization beam splitting subunit 203 to the first collimating subunit 201, thereafter it is collimated by the first collimating subunit 201 and the second collimating subunit 202, and exited by the polarization beam splitting unit 203 as the collimated light corresponding to the second image. The waveguide unit 22 guides the collimated light from the collimating unit 21 to the particular position, wherein the collimated light corresponding to the second image is for forming the virtual image corresponding to the second image. In an embodiment of the present application, the first collimating subunit 201 and the second collimating subunit 202 may be a single lens or a lens group as needed by design. It is possible to implement adjustment of a size of the virtual image corresponding to the second image by adjusting the relative position of the lens or lens group by which the first collimating subunit 201 and the second collimating subunit 202 are configured.

In addition, as shown in FIGS. 20A and 20B, the waveguide unit 22 further comprises a first reflection subunit 204 and/or a second reflection subunit 205, it is possible to control to guide the collimated light from the collimating unit 21 and corresponding to the second image to the particular position to exit, by setting the position and angle of the first reflection subunit 204 and/or the second reflection subunit 205. In a first case, the collimating unit 21 and the display component 10 are located at a first side relative to the plane on which the waveguide unit 22 is located, when the first reflection subunit 204 as shown in FIGS. 20A and 20B is provided, it is possible to exit towards the first side. In a second case, when the second reflection subunit 205 as shown in FIGS. 20A and 20B is provided, the collimated light corresponding to the second image may exit towards a second side relative to the plane on which the waveguide unit 22 is located, the first side and the second side are opposite sides relative to the plane on which the waveguide unit is located. Specifically, when the display device is applied to for example a head-mounted electronic apparatus, it is possible to adopt the configuration example in the first case, the collimated light corresponding to the second image is made to exit towards the first side, that is, the collimated light is made to exit towards the eyes of a user wearing the head-mounted electronic apparatus. When the display device is applied to for example a wrist-mounted electronic apparatus, it is possible to adopt the configuration example in the second case, the collimated light corresponding to the second image is made to exit towards the second side, that is, the collimated light is made to exit towards the eyes of a user wearing and viewing the wrist-mounted electronic apparatus. In addition, it will be further explained below in detail that the exit direction of the display device can be set as required by viewing, for example, rotation of the first reflection subunit 204 and/or the second reflection subunit 205 may be controlled to control the exit direction of the first reflection subunit 204 and/or the second reflection subunit 205, thus achieving a switch of bi-directional display of the display device.

Therefore, in the display device according to the seventeenth embodiment of the present application, in the collimating unit 21, a folded imaging light path between the first collimating subunit 201 and the second collimating subunit 202 is implemented by using the polarization beam splitter 203, thereby an overall size of the display device is reduced.

In the electronic apparatus comprising the first display device 901 and the second display device 902 described above, the first display device 901 has a first visible area corresponding to the array of display cells, the second display device 902 has a second visible area, which is at least a portion of a surface that exits light of the wave guide unit, the second visible area corresponds to a portion of the light path converting component from which the light corresponding to the second image in the light path converting component exits, the first visible area and the second visible area have a first state of being provided overlapped on the main body 91, or the first visible area and the second visible area have a second state of provided side by side on the fixing body and/or the main body.

Figure 21A:
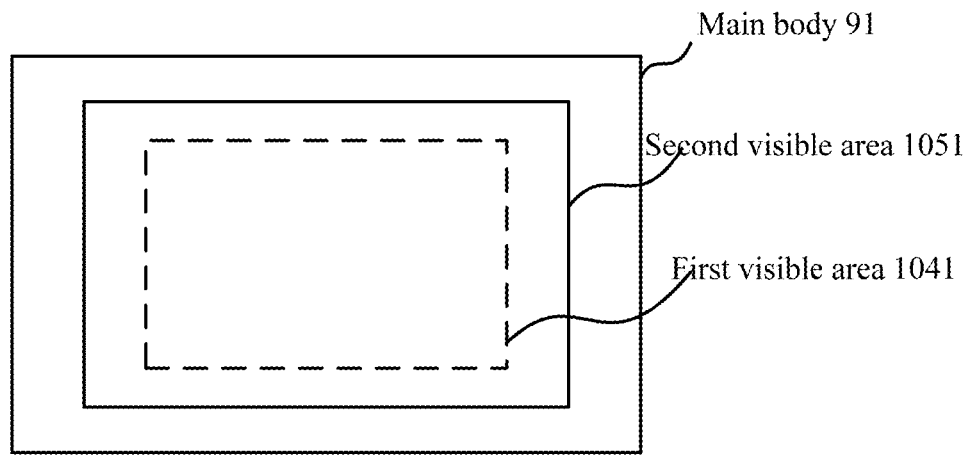
FIGS. 21A and 21B respectively are a plan view and a side view illustrating a first configuration example of a visible area of an electronic apparatus according to an embodiment of the present application.
Figure 21B:
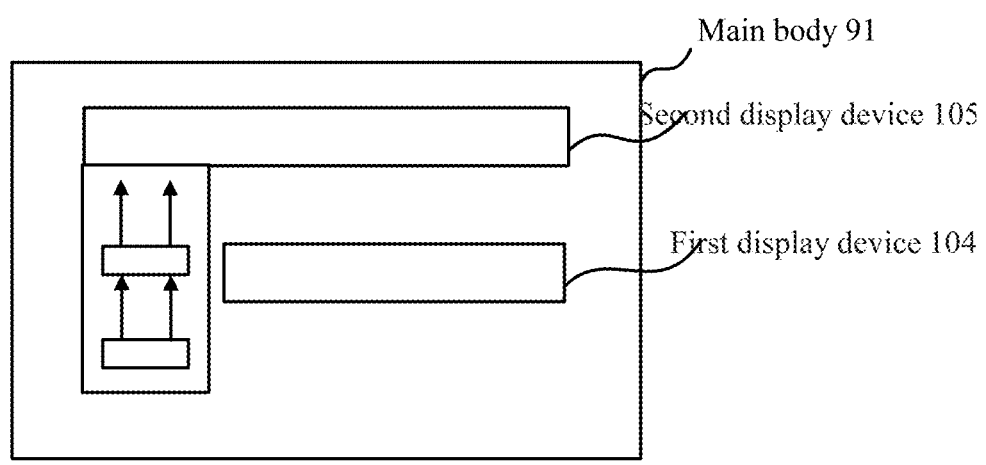

FIGS. 21A and 21B respectively are a plan view and a side view illustrating a first configuration example of a visible area of an electronic apparatus according to an embodiment of the present application.

As shown in FIG. 21A, the first visible area 1041 and the second visible area 1051 have a first configuration example of being provided overlapped on the main body 91. However, the present application is not limited thereto, the first visible area 1041 and the second visible area 1051 may also be provided overlapped on the fixing body 92.

FIG. 21B further illustrates a side view of a first configuration example that the first visible area 1041 and the second visible area 1051 are provided overlapped. As shown in FIG. 21B, the first display device 104 configured with the first visible area 1041 and the second display device 105 configured with the second visible area 1051 are provided as shown in FIG. 21B, so that light transparency of at least the visible areas that are located at the outer side of the annular space or the approximate annular space within the first visible area 1041 and the second visible area 1051 meets a predetermined condition in the outward direction of the annular space or the approximate annular space. The predetermined condition may be that light transparency is greater than a predetermined value (such as 70%). In the example shown in FIGS. 21A and 21B, the first visible area 1041 is made at the outer side. The present application is not limited thereto, the second visible area 1051 may also be made at the outer side. By means of making the light transparency of the first visible area 1041 greater than or equal to a predetermined value, the first visible area 1041 will not affect the display function of the second visual display region 1051, thus achieving a more compact configuration.

Figure 22A:
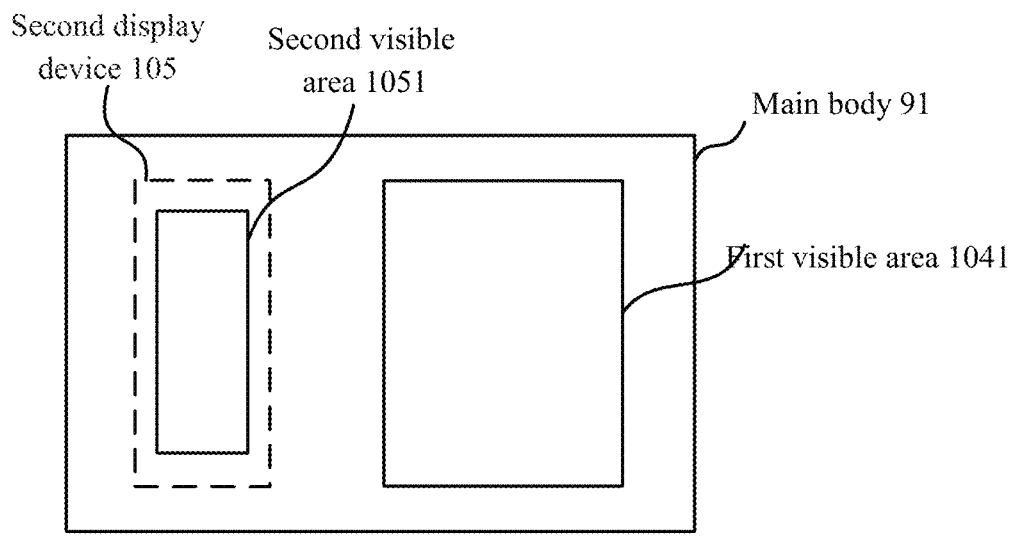
FIGS. 22A and 22B respectively are a plan view and a side view illustrating a second configuration example of a visible area of an electronic apparatus according to an embodiment of the present application.
Figure 22B:
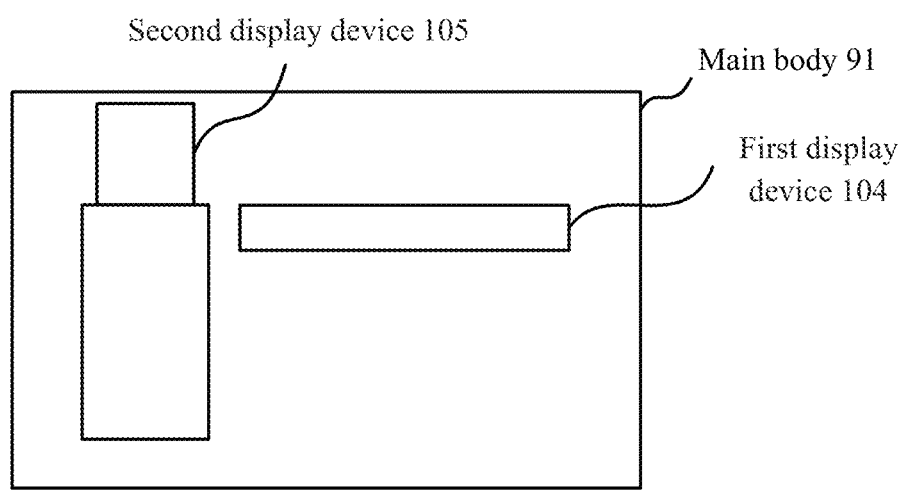

FIGS. 22A and 22B respectively are a plan view and a side view illustrating a second configuration example of a visible area of an electronic apparatus according to an embodiment of the present application.

As shown in FIG. 22A, the first visible area 1041 and the second visible area 1051 have a second configuration example of being provided adjacently on the main body 91 or the fixing body 92. As shown in FIGS. 22A and 22B, the first visible area 1041 and the second visible area 1051 are provided adjacently on the main body 91. The present application is not limited thereto, and the first visible area 1041 and the second visible area 1051 may be on the main body 91 and the fixing body 92, respectively, and a spacing between the first visible area 1041 and the second visible area 1051 is less than a threshold (e.g., 1 cm).

FIG. 22B further illustrates a side view of a second configuration example that the first visible area 1041 and the second visible area 1051 are provided overlapped. As shown in FIG. 22B, the first display device 104 configured with the first visible area 1041 and the second display device 105 configured with the second visible area 1051 are provided adjacently as shown therein, and the display directions of the first visible area 1041 and the second visible area 1051 both are in the outward direction of the annular space or the approximate annular space.

In the above, the display device according to the embodiments of the present application and the electronic apparatus using the display device are described with reference to FIGS. 1 to 22B. The display device according to the embodiments of the present application and the electronic apparatus using the display device can configure the drive lines and the display drive unit more flexibly as needed by design, thus meeting configuration requirements of the electronic apparatus having different shapes.

It should be noted that, in the specification, the terms "comprise", "include" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, but also comprise processings executed in parallel or individually but not chronologically.

Through the above description of the implementations, a person skilled in the art can clearly understand that the present disclosure may be implemented in a manner of software plus a necessary hardware platform, and the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer; a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limitation of the present disclosure.

What is claimed is:

1. A display device, comprising:
    an array of display cells, comprising a plurality of display subunits;
    a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit;
    a single display drive unit, connected with the plurality of first type of drive lines and the plurality of second type of drive lines, to provide a display drive signal for the plurality of first type of drive lines and the plurality of second type of drive lines;
    wherein at least one drive line of at least one type of drive lines of the plurality of first type of drive lines and the plurality of second type of drive lines is a curve,
    an edge of a visible area of the display device is divided into two portions, the edge of the visible area corresponding to the plurality of first type of drive lines and the plurality of second type of drive lines connected with the single display drive unit is located in a first portion of the two portions, and wherein a length of the edge of the visible area corresponding to the first portion is less than 50% of a total length of the edge of the visible area.

2. The display device as claimed in claim 1, wherein each of the plurality of first type of drive lines is a straight line and each of the plurality of second type of drive lines is a curve.

3. The display device as claimed in claim 1, wherein each of the plurality of first type of drive lines and the plurality of second type of drive lines is a curve.

4. The display device as claimed in claim 1, wherein shape of the curve matches with shape of the edge.

5. The display device as claimed in claim 4, wherein at least a portion of the edge is a curve and the edge is at least divided into a first edge portion and a second edge portion, the first edge portion and the second edge portion have different curvatures.

6. The display device as claimed in claim 1, wherein the plurality of drive lines are projected as a plurality of curves arranged equidistantly on a plane vertical to a display direction of the array of display cells.

7. The display device as claimed in claim 1, wherein the plurality of first type of drive lines and the plurality of second type of drive lines are divided into at least two groups of drive lines, each group of the at least two groups of drive lines is connected to the single display drive unit.

8. A display device, comprising:

an array of display cells, comprising a plurality of display subunits;

a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit;

a display drive unit connected with the plurality of first type of drive lines and the plurality of second type of drive lines, to provide a display drive signal for the plurality of first type of drive lines and the plurality of second type of drive lines;

wherein edge of a visible area of the display device is divided into two portions, edge of the visible area corresponding to the plurality of first type of drive lines and the plurality of second type of drive lines connected with the display drive unit is located in a first portion of the two portions, an edge length of the visible area corresponding to the first portion is less than 50% of a total edge length of the visible area.

9. An electronic apparatus comprising:

a main body comprising a processing unit configured to execute control processing of the electronic apparatus;

a first display device at least partially provided within the main body and configured to execute display of a first image, wherein the first display device comprises:

an array of display cells comprising a plurality of display subunits;

a plurality of first type of drive lines and a plurality of second type of drive lines, each of the plurality of first type of drive lines intersecting with each of the plurality of second type of drive lines, intersection thereof corresponding to each display subunit of the plurality of display subunits, to provide a display drive signal for each display subunit;

a single display drive unit connected with the plurality of first type of drive lines and the plurality of second type of drive lines to provide a display drive signal for the plurality of first type of drive lines and the plurality of second type of drive lines;

wherein at least one drive line of at least one type of drive lines of the plurality of first type of drive lines and the plurality of second type of drive lines is a curve, an edge of a visible area of the display device is divided into two portions, the edge of the visible area corresponding to the plurality of first type of drive lines and the plurality of second type of drive lines connected with the single display drive unit is located in a first portion of the two portions, and wherein a length of the edge of the visible area corresponding to the first portion is less than 50% of a total length of the edge of the visible area.

10. The electronic apparatus as claimed in claim 9 further comprising a fixing body connected with the main body configured to fix the electronic apparatus with a position relationship relative to a user of the electronic apparatus, wherein the fixing body comprises at least a fixed state in which the fixing body serves as at least a portion of an annular space or an approximate annular space that meets a first predetermined condition, the annular space or the approximate annular space surrounding periphery of a columnar body that meets a second predetermined condition.

11. The electronic apparatus as claimed in claim 10, further comprising a second display device configured to execute display of a second image and provided within the main body and/or the fixing body, wherein the first display device and the second display device are different types of display device.

12. The electronic apparatus as claimed in claim 11, wherein the first display device has a first visual area, the second display device has a second visible area, an edge by which the first visible area and the second visible area border upon each other is a curve.

13. The electronic apparatus as claimed in claim 11, wherein the first display device has a first visual area, the second display device has a second visible area, the first visible area and the second visible area share a curved edge in their adjacent places to each other.

14. The electronic apparatus as claimed in claim 9 further comprising a second display device configured to execute display of a second image and provided within the main body and/or the fixing body, wherein the first display device and the second display device are different types of display device.

15. The electronic apparatus as claimed in claim 14 wherein the first display device has a first visual area, the second display device has a second visible area, an edge by which the first visible area and the second visible area border upon each other is a curve.

* * * * *